(12) United States Patent
Cohen et al.

(10) Patent No.: US 12,441,757 B2
(45) Date of Patent: Oct. 14, 2025

(54) PLATFORM FOR SCREENING NAD+ BINDING PROTEINS IN A CELLULAR CONTEXT

(71) Applicant: OREGON HEALTH & SCIENCE UNIVERSITY, Portland, OR (US)

(72) Inventors: Michael Cohen, Portland, OR (US); Sunil K. Sundalam, Portland, OR (US)

(73) Assignee: Oregon Health & Science University, Portland, OR (US)

( * ) Notice: Subject to any disclaimer, the term of this patent is extended or adjusted under 35 U.S.C. 154(b) by 473 days.

(21) Appl. No.: 17/926,979

(22) PCT Filed: Jun. 18, 2021

(86) PCT No.: PCT/US2021/038072
§ 371 (c)(1),
(2) Date: Nov. 21, 2022

(87) PCT Pub. No.: WO2021/262548
PCT Pub. Date: Dec. 30, 2021

(65) Prior Publication Data
US 2023/0212213 A1 Jul. 6, 2023

Related U.S. Application Data

(60) Provisional application No. 63/179,832, filed on Apr. 26, 2021, provisional application No. 63/042,449, filed on Jun. 22, 2020.

(51) Int. Cl.
*C07H 19/207* (2006.01)
*C12Q 1/32* (2006.01)
*G01N 33/533* (2006.01)
*G01N 33/573* (2006.01)

(52) U.S. Cl.
CPC .............. *C07H 19/207* (2013.01); *C12Q 1/32* (2013.01); *G01N 33/533* (2013.01); *G01N 33/5735* (2013.01)

(58) Field of Classification Search
CPC ..... C07H 19/207; C12Q 1/32; G01N 33/5735
See application file for complete search history.

(56) References Cited

U.S. PATENT DOCUMENTS

2005/0208613 A1 9/2005 Qin et al.
2017/0146517 A1* 5/2017 Cohen .............. C12Y 204/0203

OTHER PUBLICATIONS

Sileikyte et al., Chemical Proteomics Approach for Profiling the NAD Interactome, J. Am. Chem. Soc. 2021, 143, pp. 6787-6791.
Alemasova et al., Survey and Summary Poly(ADP-ribosyl)ation by PARP1: reaction mechanism and regulatory proteins, Nucleic Acids Research, 2019, vol. 47, No. 8, pp. 3811-3827.
Ge et al., Chemical Proteomics-Based Drug Design: Target and Antitarget Fishing with a Catechol-Rhodanine Privileged Scaffold for NAD(P)(H) Binding Proteins, J. Med. Chem. 2008, 51, 4571-4580.
Howard et al., Structure-Guided Design and In-Cell Target Profiling of a Cell-Active Target Engagement Probe for PARP Inhibitors, ACS Chem. Biol. 2020, 15, 325-333.
Langelier et al., NAD+ analog reveals PARP-1 substrate-blocking mechanism and allosteric communication from catalytic center to DNA-binding domains, Nature Communications |2018) 9:844; DOI: 10.1038/s41467-018-03234-8.
Madern et al., Synthesis of Stable NAD+ Mimics as Inhibitors for the Legionella pneumophila Phosphoribosyl Ubiquitylating Enzyme SdeC, ChemBioChem 2020, 21, 2903-2907.
Murata et al., NAD consumption by PARP1 in response to DNA damage triggers metabolic shift critical for damaged cell survival, bioRxiv preprint doi: https://doi.org/10.1101/375212. this version posted Aug. 7, 2018.
Parker et al., Click Chemistry in Proteomic Investigations, Cell 180, Feb. 20, 2020, pp. 605-632.
Shumilin et al., Identification of Unknown Protein Function Using Metabolite Cocktail Screening, Structure 20, 1715-1725, Oct. 10, 2012.
Vaillancourt et al., Synthesis and Use of Radioactive Photoactivatable NAD+ Derivatives as Probes for G-Protein Structure, Methods in Enzymology, vol. 237, 1994, pp. 70-99.
Vaillancourt et al., 2-Azido[-32P]NAD+, a photoactivatable probe for G-protein structure: Evidence for holotransducin oligomers in which the ADP-ribosylated carboxyl terminus of αinteracts with both αand Y subunits, Proc. Natl. Acad. Sci. USA, vol. 87, pp. 3645-3649, May 1990 Biochemistry.
Zhang et al., A ribose-functionalized NAD+ with unexpected high activity and selectivity for protein poly-ADPribosylation, Nature Communications | (2019)10:4196 | https://doi.org/10.1038/s41467-019-12215-4 |.
Cohen, Interplay between Compartmentalized NAD+ Synthesis and Consumption: A Focus on the PARP Family. Genes and Development. Cold Spring Harbor Laboratory Press Mar. 1, 2020, pp. 254-262. https://doi.org/10.1101/gad.335109.119.
Loring, et al, Initial Kinetic Characterization of Sterile Alpha and Toll/Interleukin Receptor Motif-Containing Protein 1. Biochemistry 2020, 59 (8), 933-942. https://doi.org/10.1021/acs.biochem.9b01078.
Liu et al., Insights into the inhibitory mechanisms of NADH on the ay heterodimer of human NAD-dependent isocitrate dehydrogenase, Scientific Reports (2018) 8:3146 DOI: 10.1038/s41598-018-21584-7.
Murale et al., Photo-affinity labeling (PAL) in chemical proteomics: a handy tool to investigate protein-protein interactions (PPIs), Proteome Science. BioMed Central Ltd. Jun. 24, 2017, pp. 1-34. https://doi.org/10.1186/s12953-017-0123-3.
Guo et al., Developments of Bioorthogonal Handle-Containing Photo-Crosslinkers for Photoaffinity Labeling. MedChemComm. Royal Society of Chemistry Aug. 16, 2017, pp. 1585-1591. https://doi.org/10.1039/c7md00217c.
Cravatt et al., Activity-Based Protein Profiling: From Enzyme Chemistry to Proteomic Chemistry. Annu. Rev. Biochem. 2008, 77 (1), 383-414. https://doi.org/10.1146/annurev.biochem.75.101304.124125.
Jelcic, et al, Photo-Clickable ATP-Mimetic Reveals Nucleotide Interactors in the Membrane Proteome. Cell Chem. Biol. 2020. https://doi.org/10.1016/j.chembiol.2020.05.010.

(Continued)

*Primary Examiner* — Michelle F. Paguio Frising

(57) ABSTRACT

Provided herein are novel compounds, compositions, that can used as clickable, photo-affinity labeling (PAL) probes methods for use in screening NAD+ binding proteins.

11 Claims, 8 Drawing Sheets

(56) References Cited

OTHER PUBLICATIONS

Fehr, et al, The Impact of PARPs and ADP-Ribosylation on Inflammation and Host-Pathogen Interactions. Genes and Development. Cold Spring Harbor Laboratory Press Mar. 1, 2020, pp. 341-359. https://doi.org/10.1101/gad.334425.119.

Kim, et al, Poly(ADP-Ribosyl)Ation by PARP-1: "PAR-Laying" NAD+ into a Nuclear Signal. Genes and Development. Cold Spring Harbor Laboratory Press Sep. 1, 2005, pp. 1951-1967. https://doi.org/10.1101/gad.1331805.

Zatorski, et al, Chemical Synthesis of Benzamide Adenine Dinucleotide: Inhibition of Inosine Monophosphate Dehydrogenase (Types I and II). J. Med. Chem. 1996, 39 (12), 2422-2426. https://doi.org/10.1021/jm9601415.

Slama, et al, Carbanicotinamide Adenine Dinucleotide: Synthesis and Enzymological Properties of a Carbocyclic Analogue of Oxidized Nicotinamide Adenine Dinucleotide. Biochemistry 1988, 27 (1), 183-193. https://doi.org/10.1021/bi00401a028.

Dai, et al, Facile Chemoenzymatic Synthesis of a Novel Stable Mimic of NAD+. Chem. Sci. 2018, 9 (44), 8337-8342. https://doi.org/10.1039/c8sc03899f.

Carter-O'Connell, et al, Engineering the Substrate Specificity of ADP-Ribosyltransferases for Identifying Direct Protein Targets, J. Am. Chem. Soc. 2014, 136 (14), 5201-5204. https://doi.org/10.1021/ja412897a.

Carter-O'Connell, et al, Identifying Family-Member-Specific Targets of Mono-ARTDs by Using a Chemical Genetics Approach. Cell Rep. 2016, 14 (3), 621-631. https://doi.org/10.1016/j.celrep.2015.12.045.

Li, et al, Design and Synthesis of Minimalist Terminal Alkyne-Containing Diazirine Photo-Crosslinkers and Their Incorporation into Kinase Inhibitors for Cell- and Tissue-Based Proteome Profiling. Angew. Chemie—Int. Ed. 2013, 52 (33), 8551-8556. https://doi.org/10.1002/anie.201300683.

Sanderson, et al, Mechanisms Governing PARP Expression, Localization, and Activity in Cells. Critical Reviews in Biochemistry and Molecular Biology. Taylor and Francis Ltd. 2020. https://doi.org/10.1080/10409238.2020.1818686.

Wallrodt, et al, Bioorthogonally Functionalized NAD + Analogues for In-Cell Visualization of Poly(ADP-Ribose) Formation. Angew. Chemie Int. Ed. 2016, 55 (27), 7660-7664. https://doi.org/10.1002/anie.201600464.

Rodriguez, et al, Chemical Genetics and Proteome-Wide Site Mapping Reveal Cysteine MARylation by PARP-7 on Immune-Relevant Protein Targets. Elife 2021, 10. https://doi.org/10.7554/eLife.60480.

Suskiewicz, et al, HPF1 Completes the PARP Active Site for DNA Damage-Induced ADP-Ribosylation. Nature 2020, 579 (7800), 598-602. https://doi.org/10.1038/s41586-020-2013-6.

Horning, et al, Chemical Proteomic Profiling of Human Methyltransferases. J. Am. Chem. Soc. 2016, 138 (40), 13335-13343. https://doi.org/10.1021/jacs.6b07830.

Papeo, et al, Discovery of 2-[1-(4,4-Difluorocyclohexyl)Piperidin-4-YI]-6-Fluoro-3-Oxo-2,3-Dihydro-1H-Isoindole-4-Carboxamide (NMS-P118): A Potent, Orally Available, and Highly Selective PARP-1 Inhibitor for Cancer Therapy. J. Med. Chem. 2015, 58 (17), 6875-6898. https://doi.org/10.1021/acs.jmedchem.5b00680.

Kirby, et al, A Potent and Selective PARP11 Inhibitor Suggests Coupling between Cellular Localization and Catalytic Activity. Cell Chem. Biol. 2018, 25 (12), 1547-1553.e12. https://doi.org/10.1016/j.chembiol.2018.09.011.

Fjeld, et al, Differential Binding of NAD+ and NADH Allows the Transcriptional Corepressor Carboxyl-Terminal Binding Protein to Serve as a Metabolic Sensor. Proc. Natl. Acad. Sci. U. S. A. 2003, 100 (16), 9202-9207. https://doi.org/10.1073/pnas.1633591100.

Madison, et al, Nicotinamide Adenine Dinucleotide-Induced Multimerization of the Co-Repressor CtBP1 Relies on a Switching Tryptophan. J. Biol. Chem. 2013, 288 (39), 27836-27848. https://doi.org/10.1074/jbc.M113.493569.

Klepinin, et al, Adenylate Kinase and Metabolic Signaling in Cancer Cells. Frontiers in Oncology. Frontiers Media S. A. May 19, 2020. https://doi.org/10.3389/fonc.2020.00660.

Storey, K. B. Purification and properties of squid mantle adenylate kinase. Role of NADH in control of the enzyme https://www.jbc.org/content/251/24/7810 (accessed Nov. 10, 2020), Journal of Biological Chemistry 1976.

Watanabe, et al, Interaction between Cytosolic Adenylate Kinase and Nicotinamide Adenine Dinucleotide. Japanese J. Vet. Sci. 1988, 50 (2), 509-512. https://doi.org/10.1292/jvms1939.50.509.

Eng, et al, Comet: An Open-Source MS/MS Sequence Database Search Tool. Proteomics 2013, 13 (1), 22-24. https://doi.org/10.1002/pmic.201200439.

Wilmarth, et al, Techniques for Accurate Protein Identification in Shotgun Proteomic Studies of Human, Mouse, Bovine, and Chicken Lenses. J. Ocul. Biol. Dis. Infor. 2009, 2 (4), 223-234.

Keller, et al, Empirical Statistical Model to Estimate the Accuracy of Peptide Identifications Made by MS/MS and Database Search. Anal. Chem. 2002, 74 (20), 5383-5392. https://doi.org/10.1021/ac025747h.

Kleiner, et al, A Whole Proteome Inventory of Background Photocrosslinker Binding. Angew. Chemie Int. Ed. 2017, 56 (5), 1396-1401. https://doi.org/10.1002/anie.201605993.

Krohn, et al, Synthesis and Cytotoxic Activity of C-Glycosidic Nicotinamide Riboside Analogs. J. Med. Chem. 1992, 35 (3), 511-517. https://doi.org/10.1021/jm00081a012.

International Search Report and Written Opinion issued Sep. 1, 2021 for PCT/US2021/038072.

* cited by examiner

FIG. 2A
FIG. 2B
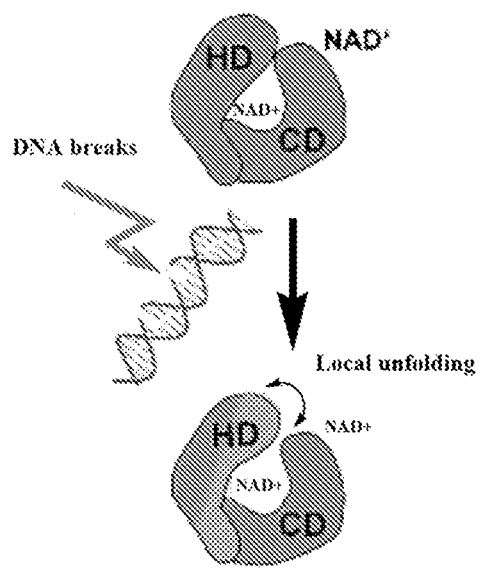
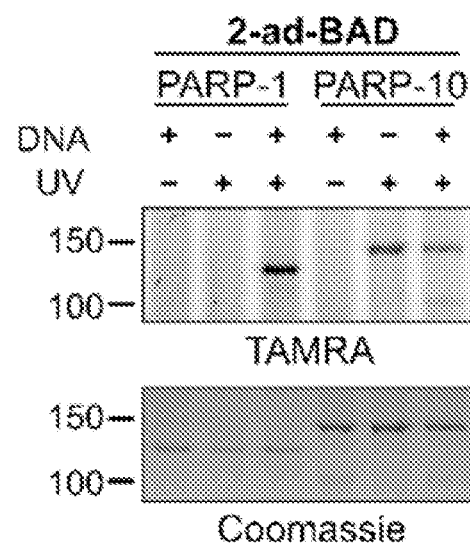
FIG. 2C
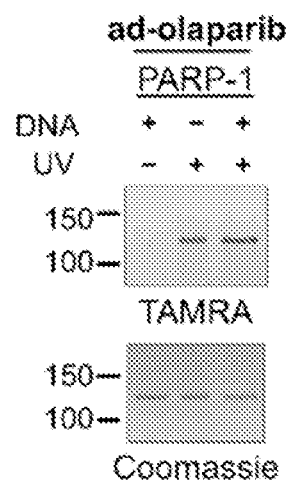

FIG. 9A
FIG. 9B
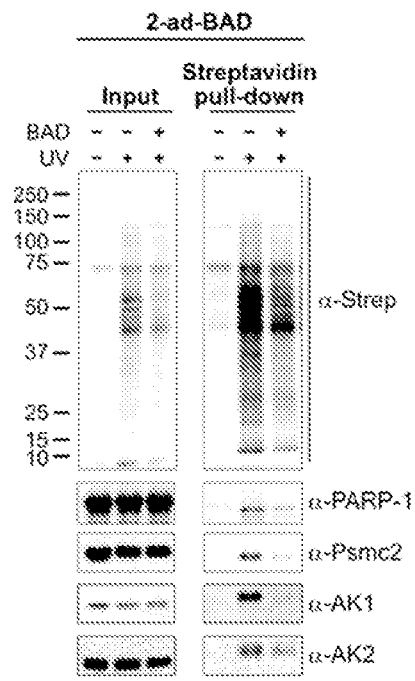
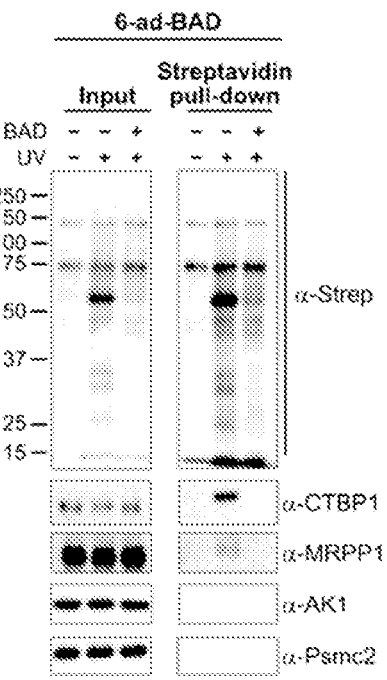
FIG. 10A
FIG. 10B
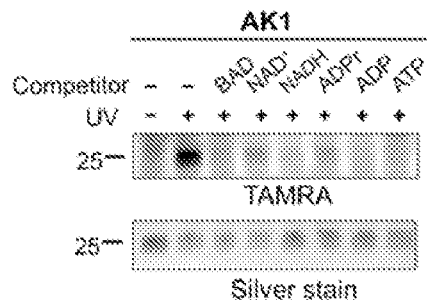
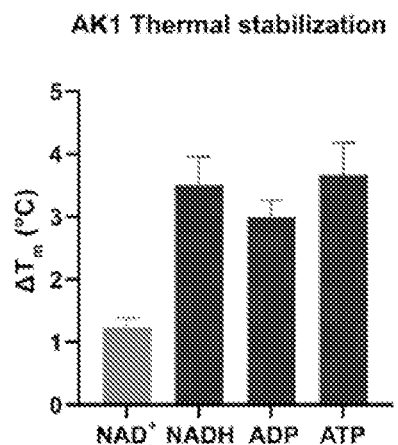

PLATFORM FOR SCREENING NAD+ BINDING PROTEINS IN A CELLULAR CONTEXT

RELATED APPLICATIONS

This application claims benefit of priority provisional U.S. patent applications 63/042,449, filed Jun. 22, 2020, and 63/179,832, filed Apr. 26, 2021.

FIELD OF THE INVENTION

Provided herein are novel compounds, compositions, and methods for screening NAD+ binding proteins.

BACKGROUND OF THE INVENTION

Nicotinamide adenine dinucleotide ($NAD^+$) and its reduced form NADH, are indispensable, multifunctional molecules. Beyond redox metabolism, $NAD^+$ has an equally important function as a substrate for post-translational modification enzymes, the largest family being the poly-ADP-ribose polymerases (PARPs, 17 family members in humans). The recent surprising discoveries of several non-canonical NAD binding proteins suggests that the NAD interactome is likely larger than previously thought; yet, broadly useful chemical tools for profiling and discovering NAD-binding proteins do not exist.

SUMMARY OF THE INVENTION

Here, we describe the design, synthesis, and validation of clickable, photo-affinity labeling (PAL) probes, 2- and 6-ad-BAD, for interrogating the NAD interactome. We show that 2-ad-BAD can label the $NAD^+$-consumers PARP-1 and PARP-10 in a UV-dependent manner, and can be used for PARP inhibitor competition labeling experiments. Intriguingly, the labeling of PARP-1 by 2-ad-BAD was dependent on PARP-1 binding to DNA, showing that it can serve as a conformational probe for PARP-1. Using chemical proteomics with 2- and 6-ad-BAD, we identified known as well as unknown $NAD^+$NADH-binding proteins, including adenylate kinase 1. Together, our study shows the utility of 2- and 6-ad-BAD as clickable PAL NAD probes

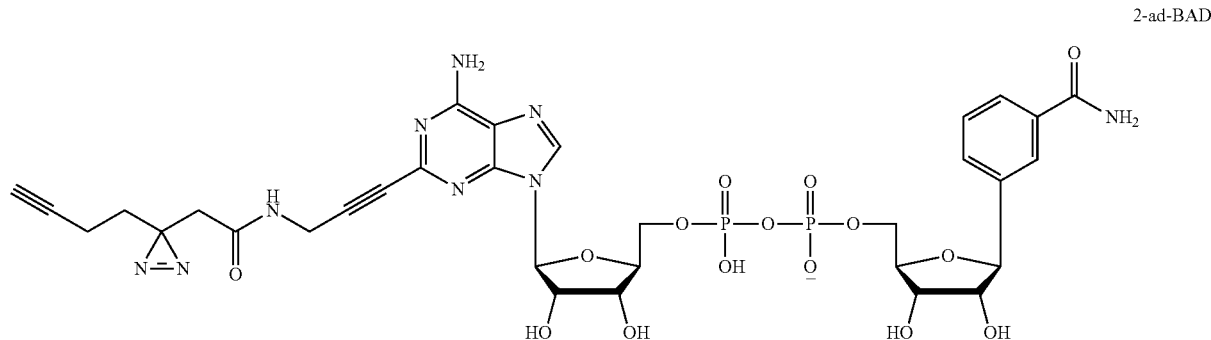

2-ad-BAD

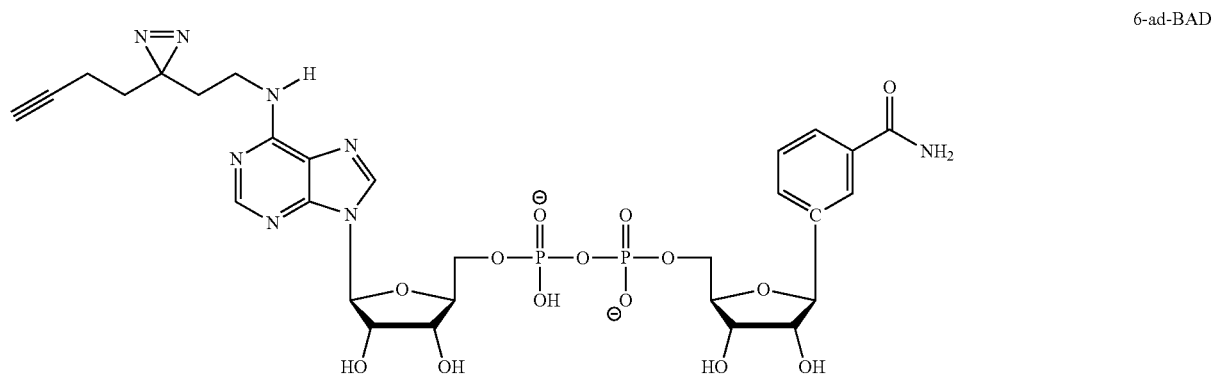

6-ad-BAD

BRIEF DESCRIPTION OF THE DRAWINGS

FIG. 2A provides a schematic representation of the activation of PARP-1 by damaged DNA.

FIG. 2B represents the activated DNA required for PARP-1, but not PARP-10, labeling by 2-ad_BAD.

FIG. 2C represents that the labeling of PARP-1 by ad-olaparib is independent of damaged DNA binding.

FIG. 9A represents validation of 2-ad-BAD targets identified in LC-MS/MS.

FIG. 9B represents validation of 6-ad-BAD targets identified in LC-MS/MS.

FIG. 10A represents SDS-PAGE and in-gel fluorescence evidence of 2-ad-BAD directly and specifically binds to AK1.

FIG. 10B represents determined thermal stability of recombinant AK1 in the absence or presence of the indicated nucleotides.

DETAILED DESCRIPTION OF THE INVENTION

Figure 1A:
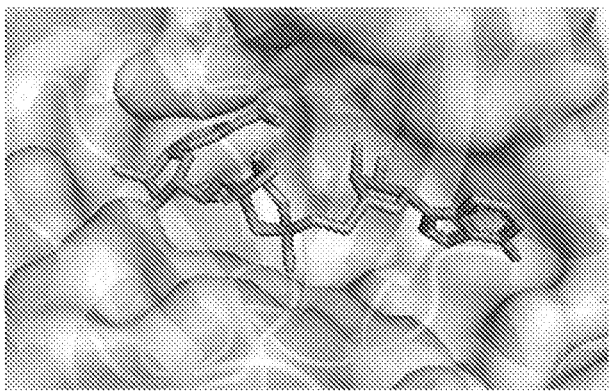
FIG. 1A provides a representation of the crystal structure of BAD bound to PARP-1

Nicotinamide adenine dinucleotide (NAD$^+$) is an intriguing molecule because it wears different hats in the cell: on the one hand it serves as a coenzyme for oxidoreductases in metabolism, and on the other it is a substrate for signaling enzymes that mediate post-translational modifications[1]. Unlike oxidoreductases, which mediate the reversible two-electron reduction of NAD$^+$ to NADH, the enzymes that use NAD$^+$ as a substrate cleave the nicotinamide glycosidic bond of NAD$^+$ leading to the consumption of NAD$^+$.

The most prominent NAD$^+$ consumers in human cells are poly-ADP-ribose polymerases (PARP-1-17) and Sirtuins (SIRT1-7)[2]. Intriguingly, recent studies show that noncanonical NAD$^+$ consumers exists (e.g., SARM1[3-6], DTX3L[7]), which have NAD$^+$ binding sites that are quite distinct from the conserved structural motifs found in canonical NAD$^+$ consumers. Additionally, NADH can act as an allosteric modulator of proteins (e.g., NAD-dependent isocitrate dehydrogenase)[8]. Hence the NAD (NAD$^+$/NADH) interactome is likely much more diverse than previously anticipated based solely on structural and functional analysis of protein sequences.

We sought an unbiased strategy to profile and discover NAD binding proteins. Chemical proteomics using photo-affinity labeling (PAL) is a powerful approach for unbiased profiling of proteome-wide small molecule—protein interactions[9]. Small molecule probes for PAL are bifunctional: they contain a photo-reactive moiety as well as a "clickable" tag (e.g., alkyne). While several photo-reactive groups have been used for PAL, diazirines (alkyl and aryl) have become quite popular because of their comparatively compact structure and excellent photo-crosslinking properties[10]. Although clickable PAL probes have been developed for nucleotides such as S-adenosyl methionine (SAH)[11], and more recently, adenosine triphosphate (ATP)[12], a clickable PAL NAD probe has heretofore not been described. We envisioned that a clickable PAL NAD probe would not only be useful for chemical proteomics experiments, but also in competition labeling experiments for screening small molecule inhibitors of NAD$^+$/NADH binding proteins and NAD$^+$ consumers, especially PARPs given their roles in human disease[13,14].

We reasoned that a clickable PAL NAD probe should contain an enzymatically stable nicotinamide glycosidic bond such that it resists cleavage NAD$^+$ by consumers. There are several NAD$^+$ analogs that fit this criterion: benzamide adenine dinucleotide (BAD)[15], carba-NAD$^{+16}$ and 4-thioribose NAD$^+$ (S-NAD$^+$)[17]. In BAD, the nitrogen in the nicotinamide ring is replaced with carbon, whereas in carba-NAD$^+$ and S-NAD$^+$ the oxygen in the nicotinamide D-ribose ring is replaced with a carbon or a sulfur, respectively. Importantly, these NAD$^+$ analogs are not cleaved by NAD$^+$ consumers[15,16]. BAD, but not carba-NAD$^+$, binds to PARP-1 and inhibits its enzymatic activity[18]. Additionally, BAD binds to and inhibits NAD$^+$/NADH binding enzymes (e.g., inosine monophosphate dehydrogenase)[15]. Therefore, we focused our design efforts based on BAD.

Figure 1B:
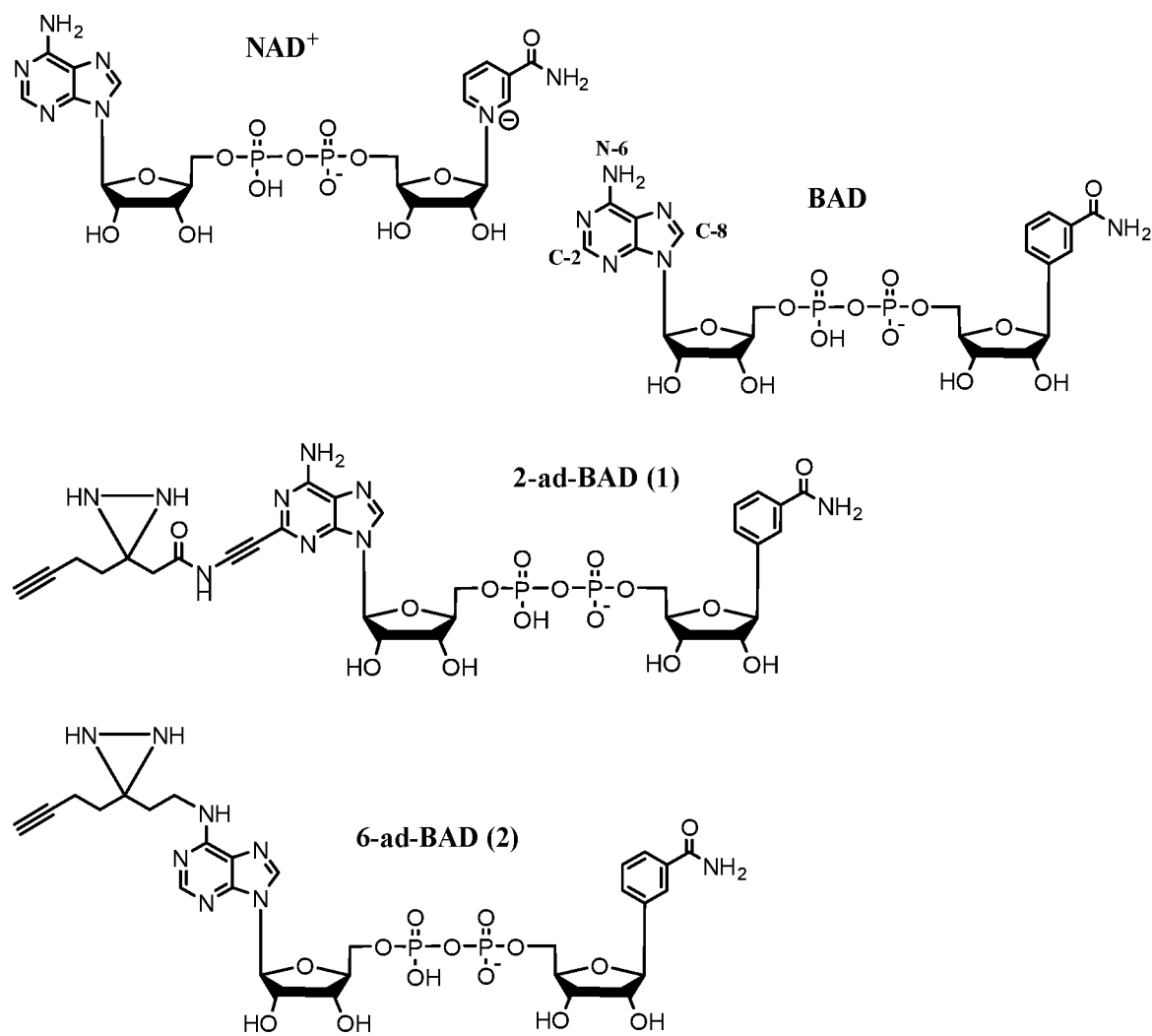
FIG. 1B provides chemical structures for NAD+, BAD, 2-ad-BAD, and 6-ad-BAD.
Figure 1C:
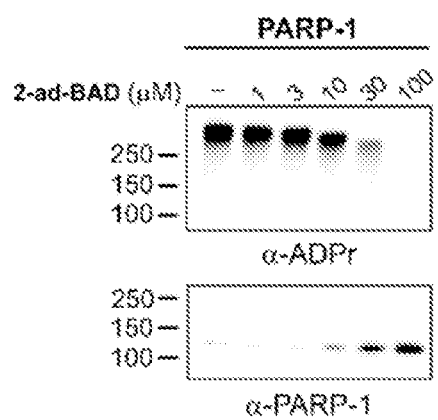
FIG. 1C represents dose dependent inhibition of PARP-1 auto-PARylation activity by 2-ad-BAD
Figure 1D:
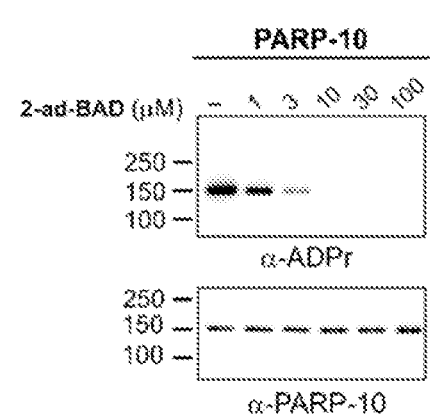
FIG. 1D represents dose dependent inhibition of PARP-10 auto-MARylation activity by 2-ad-BAD.
Figure 1E:
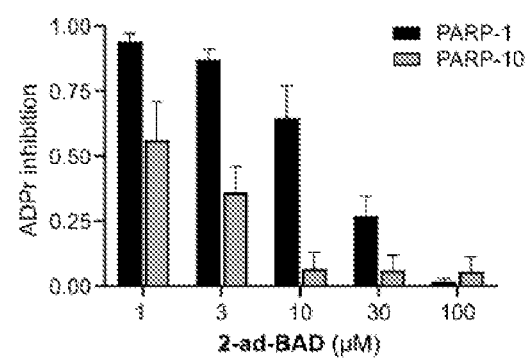
FIG. 1E provides a graph representing quantification of the results in FIGS. 1C and 1D.

To convert BAD into a clickable PAL probe for NAD$^+$ consumers and other NAD binding proteins, we first needed to identify positions on BAD that could be modified with a photo-reactive group and a clickable tag without perturbing BAD's interactions with its targets. We focused on the adenine ring of BAD because our previous studies on orthogonal $NAD^+$ analogs for engineered PARPs showed that substitutions on the nicotinamide ring were not tolerated by wild type PARPs[19,20]. On the adenine ring of BAD there are three possible positions that could be modified with a photo-reactive group and clickable tag: N-6, C-2, and C-8. We scrutinized the crystal structure of BAD bound to PARP-1 (PDB: 6bhv)[18]. In this structure, the C-2 position of the adenine ring of BAD is solvent exposed whereas N-6 position is partially solvent exposed (FIG. 1A). In contrast, the C-8 position is buried in the $NAD^+$ binding pocket. We therefore designed and synthesized a modified BAD analog with a "minimalist" linker[21] containing a diazirine and a terminal alkyne at the C-2 and N-6 positions of the adenine ring (2-ad-BAD, 1 and 6-ad-BAD, 2) (FIG. 1B and Schemes 1-6).

FIG. 1. A clickable PAL NAD probe inhibits the activity of PARP-1 and PARP-10. (FIG. 1A) Crystal structure of BAD bound to PARP-1 (PDB: 6BHV). (FIG. 1B) Chemical structures of $NAD^+$, benzamide adenine dinucleotide (BAD), 2-ad-BAD (1) and 6-ad-BAD (2). (FIG. 1C) Dose dependent inhibition of PARP-1 auto-PARylation activity by 2-ad-BAD. Note: when PARP-1 is fully modified, its molecular weight is shifted and therefore not seen at its molecular weight of ~110 kDa. Auto-PARylation of PARP-1 was detected using an anti-ADPr antibody, which detects both PARylation and MARylation. (FIG. 1D) Dose dependent inhibition of PARP-10 auto-MARylation activity by 2-ad-BAD. Auto-MARylation of PARP-10 was detected as described in (FIG. 1C). (FIG. 1E) Quantification of results in (c) and (d). Data are mean±SEM of 3 independent experiments.

We first evaluated our clickable PAL NAD probes on PARP enzymatic activity. PARPs catalyze the transfer of the ADP-ribose (ADPr) moiety of $NAD^+$ to target proteins in a process known as ADP-ribosylation. In humans, PARP family members fall into two major sub-groups: i. PARPs that catalyze addition of multiple units of ADPr, a process known as poly-ADP-ribosylation (PARylation) and ii. PARPs that catalyze the addition of a single unit of ADPr, a process known as mono-ADP-ribosylation (MARylation)[22]. In previous work we and others found that C-2 modified $NAD^+$ analogues are much better substrates than C-6 modified $NAD^+$ analogues for PARP-1 and several other PARP family members[23, 24]. Therefore, we focused on 2-ad-BAD for PARP studies. We tested the activity of 2-ad-BAD against prototypical members from each sub-group: PARP-1 (PARylating enzyme) and PARP-10 (MARylating enzyme). Similarly to BAD (Scheme 7), 2-ad-BAD inhibited PARP-1 auto-PARylation and PARP-10 auto-MARylation in a dose-dependent manner (FIG. 1C, 1D, and 1E, and FIG. 5). 2-ad-BAD was more potent against PARP-10 compared to PARP-1 (FIG. 1c-e); however, the opposite was true for BAD (FIG. 5). Nevertheless, these results show that the minimalist linker for PAL at the C-2 position of 2-ad-BAD is tolerated for both PARylating and MARylating PARPs.

We next determined the ability of 2-ad-BAD to covalently label PARP-1 in a UV-dependent manner. Previous studies showed that BAD binding to PARP-1 is DNA-dependent. In the absence of damaged DNA, the $NAD^+$ binding pocket is sterically occluded and BAD doesn't bind[18]. When PARP-1 binds damaged DNA, the steric block is relieved via long-range allosteric coupling between the DNA binding domains and the catalytic domain (FIG. 2a)[18]. We therefore incubated PARP-1 in the presence or absence of damaged DNA prior to incubation with 2-ad-BAD, followed by UV irradiation (350 nm) for 5 min, and copper-catalyzed conjugation to a TAMRA-azide probe. Strikingly, we found that the UV-dependent labeling of PARP-1 by 2-ad-BAD is dependent strictly on the presence of damaged DNA (FIG. 2b). These results also show the utility of 2-ad-BAD as a conformational reporter of the $NAD^+$ binding site in PARP-1. To determine if this is a unique feature of 2-ad-BAD compared to a PAL probe based on a PARP-1 inhibitor, we synthesized an olaparib (FDA-approved PARP-1 inhibitor) analog containing an alkyne diazirine minimal linker (ad-olaparib) (Scheme 8). We found that ad-olaparib labels PARP-1 independent of PARP-1 binding to damaged DNA (FIG. 2c). Unlike BAD, olaparib only partially occupies the ADP-ribose sub-pocket of the $NAD^+$ binding site. We envision that 2-ad-BAD can be used in future studies for further understanding the allosteric regulation of PARP-1 PARylation activity. Additionally, recent studies found that histone PARylation factor 1 (HPF1) binds to PARP-1 and regulates its catalytic activity[25]. It will be interesting to determine if HPF1, similar to damaged DNA, influences PARP-1 binding to 2-ad-BAD.

In addition to PARP-1, we found that 2-ad-BAD labeled PARP-10; however, labeling of PARP-10 was independent of damaged DNA (FIG. 2b). The labeling of PARP-10 by 2-ad-BAD was UV time- and dose-dependent (Figure S2). Unlike 2-ad-BAD, 6-ad-BAD did not label PARP-1 or PARP-10 (Figure S3). Together, these results show that 2-ad-BAD is an efficient clickable PAL NAD probe for both PARylating and MARylating PARPs.

FIG. 2. 2-ad-BAD labels the $NAD^+$ consumers PARP-1 and PARP-10, but the labeling of PARP-1 is context-dependent. (FIG. 2A) Schematic of the activation of PARP-1 by damaged DNA. In the basal state, the helical domain (HD, yellow) sterically occludes the PARP-1 $NAD^+$ binding site in the catalytic domain (CD, orange). Upon binding damaged DNA, the HD partially unfolds relieving the steric block on the $NAD^+$ binding site. (FIG. 2B) Activated DNA is required for PARP-1, but not PARP-10, labeling by 2-ad-BAD. UV-dependent, covalent labeling of PARPs was detected by in gel fluorescence scanning (TAMRA). Coomassie was used as a loading control. (FIG. 2C) The labeling of PARP-1 by the clickable olaparib PAL probe, ad-olaparib, is independent of damaged DNA binding.

Figure 3A:
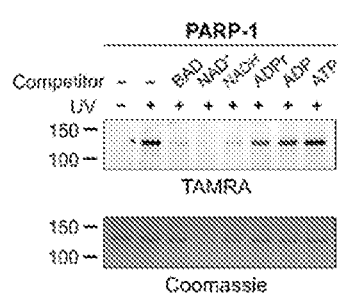
FIG. 3A represents that dinucleotides, but not mononucleotides, block 2-ad-BAD labeling of PARP-1.
Figure 3B:
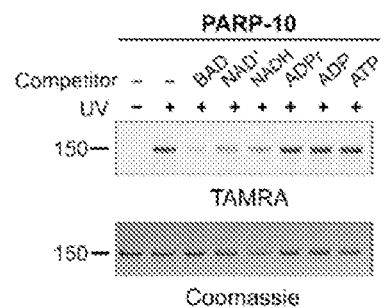
FIG. 3B represents that dinucleotides, but not mononucleotides, block 2-ad-BAD labeling of PARP-10.
Figure 8A:
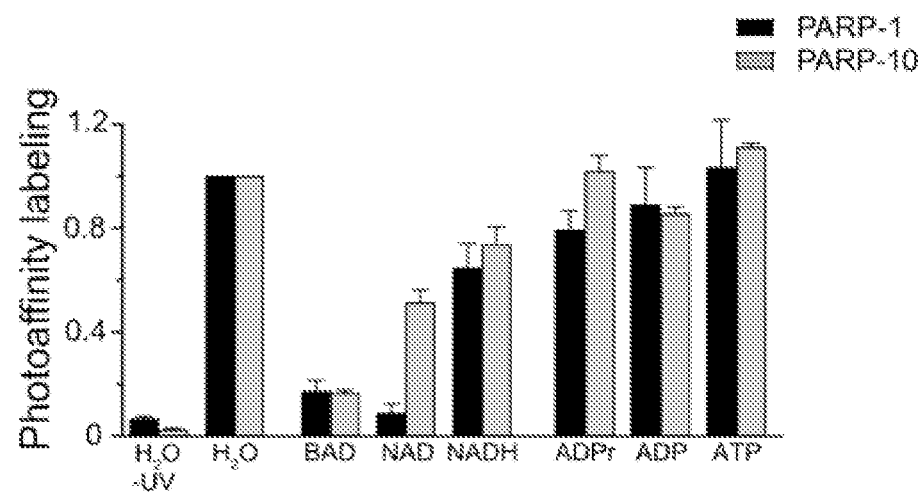
FIG. 8A represents densitometry analyses of the inhibitory effect of nucleotides on PARP-1 and PARP-10 labelling by 2-ad-BAD.

Having demonstrated efficient UV-dependent labeling of PARP-1 and PARP-10, we next examined the labeling specificity of 2-ad-BAD. We pre-incubated either PARP-1 or PARP-10 with a series of adenine-containing nucleotides prior to incubation with 2-ad-BAD and subsequent. We found that $NAD^+$ and related dinucleotides (BAD, NADH) reduced 2-ad-BAD labeling of PARP-1 and PARP-10 (FIGS. 3A, 3B and FIG. 8A). By contrast, the mononucleotides ADPr, ADP or ATP did not block labeling of PARP-1 and PARP-10 by 2-ad-BAD (FIGS. 3A,B and FIG. 8A). These results further confirm the labeling specificity of 2-ad-BAD for the $NAD^+$ binding site in PARP family members.

FIG. 3. 2-ad-BAD labels the $NAD^+$ binding site and can be used for profiling PARP inhibitor selectivity. (FIG. 3A) Dinucleotides ($NAD^+$, NADH, and BAD) but not mononucleotides (ADPr, ADP, ATP) block 2-ad-BAD labeling of PARP-1. (FIG. 3B) Dinucleotides ($NAD^+$, NADH, and BAD) but not mononucleotides (ADPr, ADP, ATP) block 2-ad-BAD labeling of PARP-10. (FIG. 3C) BAD, and the PARP-1 selective NMS-P118, but not the PARP-10 inhibitor ITK6, dose-dependently block the labeling of PARP-1 by 2-ad-BAD. (FIG. 3D) BAD, ITK6, but not NMS-P118 dose-dependently block the labeling of PARP-10 by 2-ad-BAD.

Figure 3C:
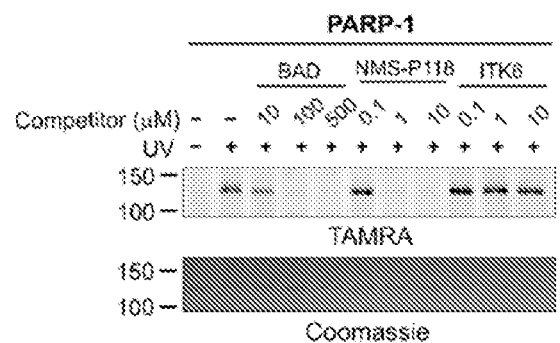
FIG. 3C represents that BAD and NMS-P118 dose-dependently block labeling of PARP-1 by 2-ad-BAD, but ITK6 does not.
Figure 3D:
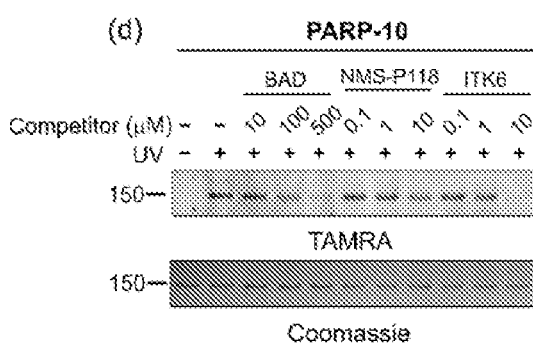
FIG. 3D represents that BAD and ITK6 dose-dependently block labeling of PARP-10 by 2-ad-BAD, but NMS-P118 does not.
Figure 8B:
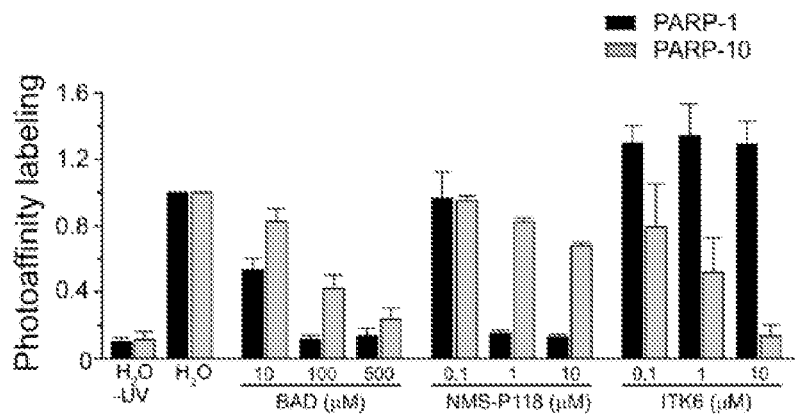
FIG. 8B graphs NMS-P118 blockage of the labeling of PARP-1 by 2-ad-BAD and ITK6 blockage of the PARP-10 labeling by 2-ad-BAD in a dose dependent manner.

PAL probes that target broadly enzymes belonging to particular family (e.g., methyltransferases) have found utility in competitive labeling experiments, especially for examining family-wide inhibitor selectivity[26]. We envisioned that 2-ad-BAD could be used for examining inhibitor selectivity across the PARP family. To test this idea, we performed competition labeling experiments with two PARP inhibitors: NMS-P118, a selective inhibitor of PARP-1[27], and ITK6, a pan MARylating PARP inhibitor that inhibits PARP-10[28]. Consistent with the effects of these compounds on PARP-1 or PARP-10 enzymatic activity (FIGS. 5A, 5B), NMS-P118 blocked the labeling of PARP-1 whereas ITK6 blocked the labeling of PARP-10 by 2-ad-BAD in dose dependent manner (FIGS. 3C, 3D, and FIG. 8B). By contrast, NMS-118 did not block the labeling of PARP-10 and ITK6 did not block the labeling of PARP-1 by 2-ad-BAD (FIGS. 3C,D and Figure S4b). Taken together, these results show that 2-ad-BAD can be used for evaluating the potency and profiling the selectivity of PARP inhibitors across multiple PARP family members.

Figure 4A:
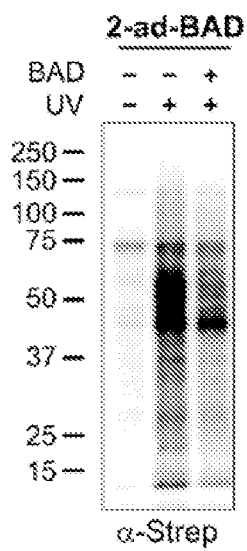
FIG. 4A represents the use of 2-ad-BAD labeling of NAD binding proteins in cell lysates and enrichment of labeled proteins using streptavidin agarose.
Figure 4B:
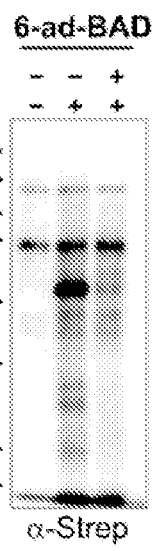
FIG. 4B represents the use of 6-ad-BAD labeling of NAD binding proteins in cell lysates and enrichment of labeled proteins using streptavidin agarose.
Figure 4C:
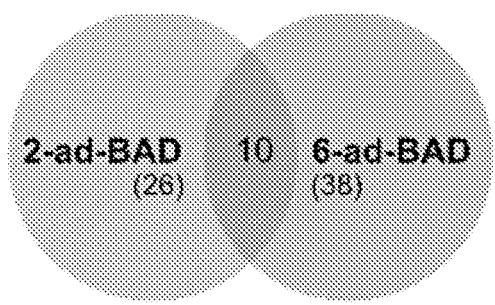
FIG. 4C provides a Venn diagram showing targets of 2-ad-BAD and 6-ad-BAD.

We next used our clickable PAL NAD probes in chemical proteomic experiments for profiling the NAD interactome in whole cell lysates. We treated HEK 293T cell lysates with either 2-ad-BAD or 6-ad-BAD alone or in the presence of BAD (competitor), followed by UV irradiation. Protein targets of 2-ad-BAD or 6-ad-BAD were detected by click conjugation with desthiobiotin-azide. We detected the labeling of several proteins, many of which were competed by BAD (FIG. 4a, b). We enriched desthiobiotinylated proteins using streptavidin agarose (FIGS. 4A, 4B), proteolyzed, and subjected eluted peptides to LC-MS/MS. We identified 261 and 141 proteins in 2-ad-BAD and 6-ad-BAD samples, respectively, that were at least 2-fold enriched in UV-irradiated samples in duplicate LC-MS/MS experiments. 74 total proteins were competed at least 2-fold by BAD; of these, 10 were identified in both data sets (FIG. 4C). Hence 2-ad-BAD and 6-ad-BAD mostly label distinct proteins, but also share some targets.

FIG. 4. Chemical proteomics using 2- and 6-ad-BAD identifies known and novel NAD binding proteins. (FIG. 4A and FIG. 4B) Labeling in cell lysates and enrichment of labeled proteins (containing desthiobiotin after click reaction) using streptavidin agarose. (FIG. 4C) Venn diagram showing targets of 2-ad-BAD and of 6-ad-BAD. (FIG. 4D) Pie chart showing distribution of nucleotide binding among targets.

Figure 4D:
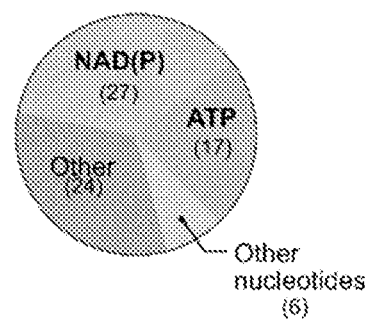
FIG. 4D provides a pie chart showing distribution of nucleotide binding among targets.

We performed further analyses on the 74 targets that were competed by BAD, focusing initially on their nucleotide binding capabilities. The largest group of nucleotide binding proteins are $NAD^+/NADH/NADP^+/NADPH$ binders (27), followed by ATP binders (17), AMP (2), GTP (2), ADPr (1) and FAD (1) binders (FIG. 4D). Intriguingly, the other 24 targets are not known to bind NAD or related nucleotides (FIG. 4d). Next, we confirmed our LC-MS/MS results using streptavidin enrichment followed by immunoblot detection using commercially available target specific antibodies. In addition to PARP-1, we confirmed the unknown $NAD^-$ binders 26S proteasome regulatory subunit 7 (Psmc2) and adenylate kinase (AK) 1 and 2 as targets of 2-ad-BAD, but not 6-ad-BAD (FIG. 9). We also confirmed targets of 6-ad-BAD, including the known NAD-binder C-terminal Binding Protein 1 (Ctbp1)[29,30], a transcriptional regulator whose co-repressor function is regulated by $NAD^+/NADH$ binding, as well as the unknown NAD-binder tRNA methyltransferase 10 homolog C (TRMT10C/MRPP1) (FIG. 9B). Together, our results show that 2-ad-BAD and 6-ad-BAD are useful in chemical proteomics applications for identifying known—and potentially novel—NAD binding proteins.

Lastly, we further evaluated the binding of $NAD^+$ and related nucleotides to the 2-ad-BAD target AK1. AK1 is an enzyme that transfers the terminal phosphate group between ATP and AMP, and thus is critical in cellular energy state monitoring and stress response[31]. We found that the labeling of recombinant AK1 by 2-ad-BAD is effectively competed by its known ligands, AMP and ATP, but also BAD, NADH, and to a lesser extent $NAD^+$ and ADPr (FIG. 10A). We further evaluated nucleotide binding to AK1 by thermal shift analysis using differential scanning fluorimetry (DSF). While both $NAD^+$ and NADH caused a shift in AK1 thermal stabilization compared to vehicle control, NADH showed a thermal shift similar to ATP and ADP (FIG. 10B). Together, these results suggest that NADH, and perhaps $NAD^+$ can bind to AK1. Interestingly, squid mantle AK is less susceptible to denaturation by heat or proteolysis in the presence of NADH. NADH was also shown to act as a non-competitive inhibitor of squid AK[32]. In another study, it was found that AK1 can be eluted from blue dextran-Sepharose chromatography (used historically for purifying $NAD^+/NADH$ dehydrogenases) by NADH, and its activity was competitively inhibited by both $NAD^+$ and $NADH^{33}$.

In this study we developed new clickable PAL NAD probes that label NAD-binding proteins in a UV-dependent manner. 2-ad-BAD labels the $NAD^+$ consumers PARP-1 and PARP-10 in a UV-dependent manner, and can be used for profiling the selectivity of PARP inhibitors across multiple PARP family members. We also demonstrated that 2-ad-BAD and 6-ad-BAD can identify known and unknown NAD binding proteins in a cellular context. A limitation of 2- and 6-ad-BAD is that they might not capture all possible NAD binding proteins in cells due to steric constraints or lack of efficient photocrosslinking. Nevertheless, we envision that our clickable PAL NAD probes will be useful in future chemical proteomics studies for profiling the $NAD^+$ interactome across different tissues as well as in disease contexts (e.g., cancer and neurodegenerative diseases).

Figure 5A:
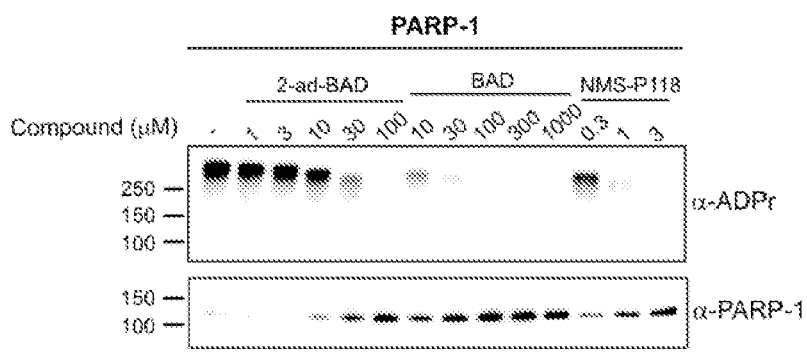
FIG. 5A depicts separation on SDS-PAGE representing 2-ad-BAD inhibition of PARP-1.
Figure 5B:
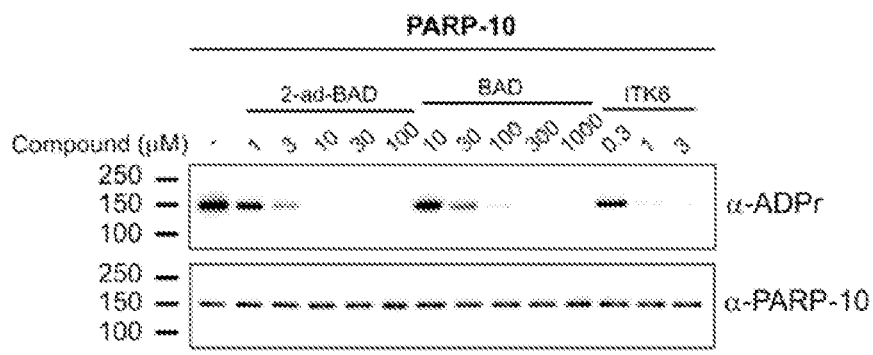
FIG. 5B depicts separation on SDS-PAGE representing 2-ad-BAD inhibition of PARP-10.
Figure 5C:
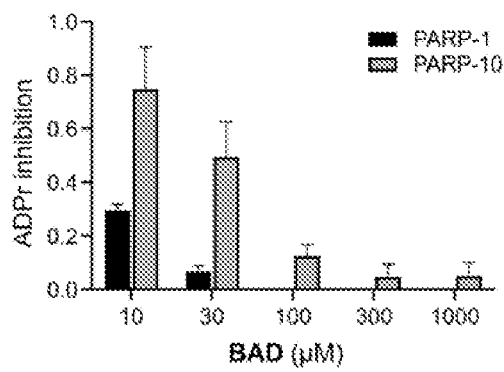
FIG. 5C provides a graph representing densitometry analyses of (5A) and (5B) comparing inhibitory effect of BAD on PARP-1 and PARP-10 auto-ADP-ribosylation.

FIG. 5. A clickable $NAD^+$ PAL probe (2-ad-BAD) inhibits PARP-1 and PARP-10 activity in concentration response. (FIG. 5A) 50 nM of recombinant $His_6$-PARP-1 was incubated with 10 µg/mL activated DNA in 100 mM NaCl, 50 mM HEPES [pH 7.4], 4 mM $MgCl_2$, 0.2 mM TCEP for 10 min, then treated with indicated competitor (BAD or the PARP-1 inhibitor NMS-P118) for additional 10 min. 50 µM $NAD^+$ was then added to initiate auto-PARylation of PARP-1. After 10 min, the reaction was quenched by addition of 4× Laemmli sample buffer and boiling at 95° C. for 5 min. Protein samples were separated by SDS-PAGE, transferred onto nitrocellulose and probed with indicated antibodies. (FIG. 5B) Experiments were performed essentially as in (5A) with the exception that damaged DNA was omitted and the PARP-10 inhibitor ITK6 was used instead of NMS-P118. (FIG. 5C) Densitometry analyses of (5A) and (5B) comparing inhibitory effect of BAD on PARP-1 and PARP-10 auto-ADP-ribosylation. Data are mean±SEM of 3 independent experiments.

Figure 6A:
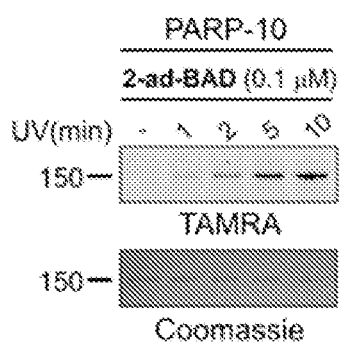
FIG. 6A represents in-gel fluorescence scanning of 0.1 µM 2-ad-BAD photo cross-linked to PARP-10 following UV irradiation for the indicated times.
Figure 6B:
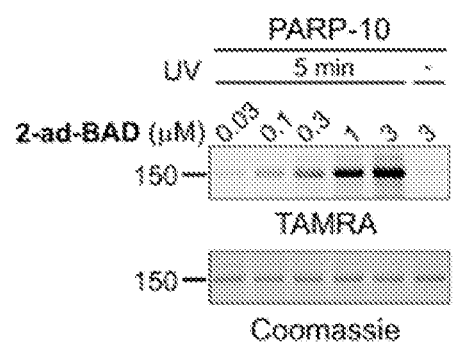
FIG. 6B represents in-gel fluorescence scanning of 2-ad-BAD photo cross-linked to PARP-10 using consistent irradiation for 5 minutes with different concentrations of 2-ad-BAD.

FIG. 6. Photo-crosslinking of 2-ad-BAD to PARP-10 is both UV time- and dose-dependent. (FIG. 6A) PARP-10 (250 nM) in 100 mM NaCl, 50 mM HEPES [pH 7.4], 4 mM $MgCl_2$, 0.2 mM TCEP was incubated with 2-ad-BAD for 10 min and then irradiated for indicated times. PARP-10 was coupled to tetramethylrhodamine azide (TAMRA-azide) using click chemistry, resolved by SDS-PAGE and subjected to in-gel fluorescence scanning. Coomassie stain was used for loading control. (FIG. 6B) Experiments were performed essentially as in (6A) only that irradiation time was kept constant at 5 min and effects of increasing concentrations of 2-ad-BAD were studied. Data are representative of 2 independent experiments.

Figure 7:
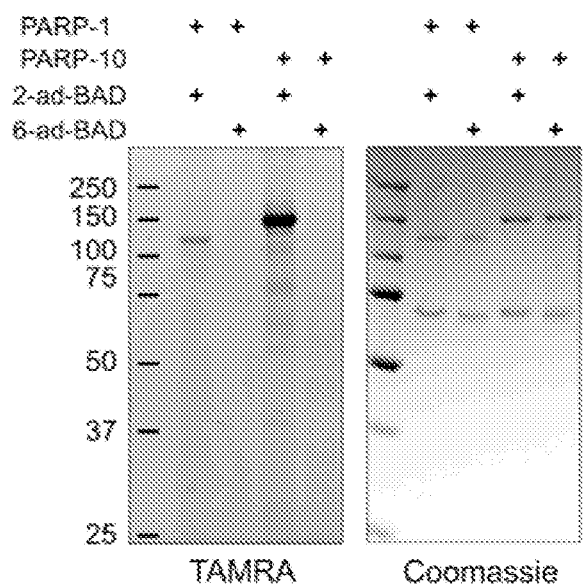
FIG. 7 represents in-gel labeling experiments performed as described for FIG. 6 using 1 µM of either 2- or 6-ad-BAD.

FIG. 7. 6-ad-BAD does not label PARP-1 or PARP-10. Labeling experiments were performed as described in FIG. 6 using 1 µM of either 2- or 6-ad-BAD.

FIG. 8. Densitometry analyses of FIG. 3A panels (A,B) comparing the inhibitory effect of nucleotides and (B) panels (C,D) comparing inhibitory effect of PARP inhibitors on PARP-1 and PARP-10 labelling by 2-ad-BAD. TAMRA in-gel fluorescence was normalized to Coomassie staining, except for PARP-1 NAD$^+$ treated samples where relative to control TAMRA signal is reported due to auto-PARylation induced molecular weight shift and therefore not detectable Coomassie signal at PARP-1 molecular weight of ~110 kDa. Data are mean±SEM of 3 independent experiments.

FIG. 9. Validation of (FIG. 9A) 2-ad-BAD and (FIG. 9B) 6-ad-BAD targets identified in LC-MS/MS. HEK293T lysates were preincubated with 1 mM BAD for 10 min followed by 10 min incubation with 10 µM of indicated probe. Samples were then UV irradiated for 5 min (or kept in the dark), coupled to desthiobiotin-azide using click chemistry, enriched with streptavidin beads, resolved by SDS-PAGE and immunoblotted with indicated antibodies.

FIG. 10. Validation of Adenylate kinase 1 (AK1) as a putative NAD$^+$/NADH binding protein. (FIG. 10A) 2-ad-BAD directly and specifically binds to AK1. Recombinant AK1 (500 nM) in 100 mM NaCl, 50 mM HEPES [pH 7.4], 4 mM MgCl$_2$, 0.2 mM TCEP was incubated with 150 µM of indicated competitor molecule for 10 min, followed by 10 min treatment with 0.3 µM 2-ad-BAD. Samples were then subjected to UV light for 5 min, conjugated to TAMRA using Click chemistry, separated by SDS-PAGE and in-gel fluorescence was recorded. Silver staining was used to demonstrate comparable protein loading. (FIG. 10B) A differential scanning fluorimetry assay is supportive of NADH as novel AK1 ligand. Recombinant AK1 (0.1 mg/mL) in 100 mM NaCl, 50 mM HEPES, pH 7.4, 4 mM MgCl$_2$, 7.5× SYPRO Orange was tested for thermal stability in the absence or presence of indicated nucleotides at 1 mM. Ordinate reports on the difference of melt peak temperature prompted by indicated treatments. Data are mean±SEM of 3 independent experiments.

Definitions

The acronym "DCCH" refers to 7-(diethylamino)coumarin-3-carbohydrazide.

The acronym "SARM1" refers to sterile α and HEAT/armadillo motif-containing protein or sterile alpha and TIR motif containing 1.

The acronym "DTX3L" refers to E3 Deltex-3-like protein ligase.

The acronym "TCEP" refers to the reducing agent tris(2-carboxyethyl)phosphine.

The term "useful amount" refers to the amount of a compound or composition required to provide a diagnostically or scientifically useful determination. In regard to a photo labeling probe, a useful amount would be an amount or concentration of an agent needed to label the intended target in a sample or composition for detection.

Experimental Methods

Protein Expression and Purification

Full length His$_6$-PARP-1 and His$_6$-SUMO-PARP-10 proteins we expressed and purified as previously described[34,35].

In Vitro PARP-1 and PARP-10 Activity Assay

PARP-1 or PARP-10 were diluted to 20 nM in reaction buffer consisting of 100 mM NaCl, 50 mM Hepes, 4 mM MgCl$_2$, 0.2 mM TCEP [pH 7.4] and—in assays of PARP-1 only—10 µg/mL of activated calf thymus DNA (Sigma-Aldrich D4522) followed by 10 min incubation with ddH$_2$O or indicated concentrations of BAD, 2-ad-BAD, NMS-P118 (Selleckchem) or ITK6[2] at RT. The ADP-ribosylation reactions were started by addition of 50 µM NAD$^+$, let to proceed for 10 min RT before quenching with 4× Laemmli sample buffer and boiling for 5 min at 95° C.

In Vitro Photocrosslinking and Click Chemistry

Treatments. Recombinant PARP-1 (250 nM), PARP-10 (250 nM) or AK1 (500 nM; Novus Biologicals) were diluted in 100 mM NaCl, 50 mM HEPES [pH 7.4], 4 mM MgCl$_2$, 0.2 mM TCEP. PARP-1 reactions also contained 10 µg/mL of activated calf thymus DNA (Sigma-Aldrich D4522), unless otherwise noted. In experiments reported in FIG. 2, the samples were treated with 0.1 µM 2-ad-BAD or ad-olaparib for 10 min. In competition experiments reported in FIG. 3 and Figure S3, samples were first treated with 150 µM of indicated nucleotides for 10 minute and then with 0.3 µM 2-ad-BAD for additional 10 min. All treatments occurred at RT. Samples were then kept in the dark or irradiated for 5 min in the RPR-100 Photochemical Reactor (Rayonet) equipped with 350 nm lamps at 4° C. The 2-ad-BAD concentrations and UV irradiation time were selected based on data obtained in experiments reported in Figure S2.

Click Chemistry. 25 µL of each sample was mixed with 5 µL of fatty acid free BSA and SDS to give a final Click reaction concentration of 1 mg/mL and 1%, respectively. Click reactions were started by adding 15 µL of PBS based 3× click reaction mix (final 1× concentrations shown): 100 µM Tris[(1-benzyl-1H-1,2,3triazol-4-yl)methyl]amine (TBTA, Click Chemistry Tools), 1 mM CuSO$_4$, 40 µM tetramethylrhodamine (TAMRA)-azide (Click Chemistry Tools), 1 mM Tris(2-carboxyethyl)phosphine hydrochloride (TCEP, Thermo Fisher) and 5% tert-Butyl alcohol to each sample, and let to proceed for 1 h at RT while gently shaking. Reactions were stopped by adding 4× Laemmli sample buffer and boiling at 95° C. for 5 min.

In gel fluorescence and staining. Samples were loaded to 10 or 12% SDS-polyacrylamide gels and run until the dye front left the gel. In-gel fluorescence was detected with ChemiDoc XRS+ (Biorad) using Rhodamine filter and then the gels were stained with Coomassie blue or Silver using standard protocols.

Photocrosslinking in cell lysates, Click chemistry, immunocapture and sample preparation for LC-MS/MS Cell culture and lysis. HEK 293T cells were grown in DMEM (Gibco)+10% fetal bovine serum (Sigma) at 37° C. and 5% CO$_2$ to confluence. Cells were lysed on ice in 150 mM NaCl, 50 mM HEPES [pH 7.4], 5 mM MgCl$_2$, 10% Glycerol, 0.1% NP-40 and EDTA-free protease inhibitor cocktail (Roche) for 30 min on ice. The lysate was cleared by centrifugation at 10,000 g for 15 min at 4° C. and then desalted with Zeba™ Spin Desalting Columns (Thermo Fisher) according to manufacturer's instructions. Protein concentration was determined with Bio-Rad Protein assay and the lysate was diluted in lysis buffer to 2 mg/ml.

Treatments. Cell lysates were first treated with $ddH_2O$ or 1 mM BAD for 10 min at RT and then with 10 µM 2-ad-BAD or 6-ad-BAD for additional 10 min. Samples were then kept in the dark or irradiated for 5 min in the RPR-100 Photochemical Reactor (Rayonet) equipped with 350 nm lamps at 4° C.

Click Chemistry. SDS (final concentration 0.05%) was added to 960 µL of each sample, followed by conjugation to desthiobiotin by adding 480 µL of PBS based 3× Click reaction mixture containing (final concentrations): 100 µM Tris[(1-benzyl-1H-1,2,3triazol-4-yl)methyl]amine (TBTA, Click Chemistry Tools), 1 mM $CuSO_4$, 200 µM desthioBiotin-peg3-azide (Click Chemistry Tools), 1 mM Tris(2-carboxyethyl)phosphine hydrochloride (TCEP, Thermo Fisher) and 5% tert-Butyl alcohol. Reactions were let to proceed for 1 h at RT while gently shaking and then stopped by adding 9 parts of cold methanol. Protein was precipitated overnight at −20° C. Samples were then centrifuged 3,500 g for 10 min at 4° C., aqueous/MeOH solution was removed and protein precipitates were washed 3 times as follows: pellets were re-suspended in 1 ml cold MeOH by pipetting and sonication, re-precipitated for 15 min at −20° C. and then spun at 10,000 g for 10 min at 4° C. After the final wash, the pellets were air dried at RT for ~10 min and re-solubilized in 700 µL 8 M urea in 0.1 M TEAB by bath sonication and transferred to LoBind microcentrifuge tubes (Eppendorf).

Immunoprecipitation. Biotinylated proteins were enriched with streptavidin agarose resin as follows: 2.1 mL of 0.1 M TEAB was added to protein solutions to reduce the urea concentration to 2 M. Then, 350 µL of streptavidin beads (50% slurry; Thermo Fisher 20349) were preequilibrated with 1% NP-40 in 0.1 M TEAB and a total of 2.8 mL of that solution was added to protein samples overnight at 4° C. Beads were then spun 2,000 g for 5 min at 4° C., supernatant removed and the beads were washed 3× each with 1 mL of: (i) 4 M urea in 0.1 M TEAB, (ii) 1% NP-40 in PBS, (iii) PBS and (iv) 50 mM ammonium bicarbonate; centrifuging 2000 g for 3 min each time.

Sample preparation for LC-MS/MS analysis. After final wash, beads with enriched biotinylated proteins were suspended in 700 µL 8M urea in 0.1 M TEAB and thiols were reduced with 1.4 mg/mL dithiothreitol (DTT; Fisher) followed by alkylation with 3.4 mg/mL iodocetamide (Calbiochem), both incubations occurred for 45 min at 37° C. while gently shaking. Free iodacetamide was quenched with 1.4 mg/mL DTT for 30 min at RT while gently shaking. Then beads were spun as above, washed with 1 mL 2M urea in 0.1 M TEAB and re-suspended in 400 µL of the same buffer supplemented 1 mM $CaCl_2$ and 2 µg sequencing grade trypsin (Promega). Proteins were digested 37° C. overnight while shaking. Samples were then transferred to centrifuge columns (Thermo Fisher 69705) and digested peptides were collected to LoBind microcentrifuge tubes upon spinning for 3 min at 2000 g. MS grade formic acid was then added to 5% and samples were kept at −20° C. till LC-MS/MS analysis.

LC-MS/MS Analysis

Following digestion, all samples were taken to dryness by vacuum centrifugation. Supernatants from on-bead digests were dissolved in 100 µL of 5% formic acid and after 0.22 µm filtering of dissolved samples using Millipore Ultrafree-CL centrifugal filters, 20 µL of each digest were separated using a Dionex RSLC UHPLC system, then delivered to a QExactive HF (Thermo Scientific) mass spectrometer using electrospray ionization with a Nano Flex Ion Spray Source fitted with a 20 µm stainless steel nano-bore emitter spray tip and 1.0 kV source voltage. Xcalibur version 4.0 was used to control the system. Samples were applied at 10 µL/min to a Symmetry C18 trap cartridge (Waters) for 10 min, then switched onto a 75 µm×250 mm NanoAcquity BEH 130 C18 column with 1.7 µm particles (Waters) using mobile phases water (A) and acetonitrile (B) containing 0.1% formic acid, 7.5-30% acetonitrile gradient over 60 min, and 300 nL/min flow rate. Survey mass spectra were acquired over m/z 375-1400 at 120,000 resolution (m/z 200) and data-dependent acquisition selected the top 10 most abundant precursor ions for tandem mass spectrometry by HCD fragmentation using an isolation width of 1.2 m/z, normalized collision energy of 30, and a resolution of 30,000. Dynamic exclusion was set to auto, charge state for MS/MS +2 to +7, maximum ion time 100 ms, minimum AGC target of $3 \times 10^6$ in MS1 mode and $5 \times 10^3$ in MS2 mode. Comet (v. 2016.01, rev. 2)[36] was used to search MS2 Spectra against an April. 2020 version of a uniprot FASTA protein database containing canonical Homo sapien sequences, concatenated sequence-reversed entries to estimate error thresholds and 179 common contaminant sequences and their reversed forms. The database processing used python scripts available at https:/github.com/pwilmart/fasta_utilites.git and Comet results processing used the PAW pipeline 2 from https://github.com/pwilmart/PAW_pipline.git.

Comet searches for all samples was performed with trypsin enzyme specificity with monoisotopic parent ion mass tolerance set to 1.25 Da and monoisotopic fragment ion mass tolerance set at 1.0005 Da. A static modification of +57.02146 Da added to all cysteine residues and a variable modification of +15.9949 Da on Methionine residues. Linear discriminant transformation was used to improve the identification sensitivity from the Comet analysis[37,38]. Comet scores were combined into linear discriminant function scores, and discriminant score histograms created separately for each peptide charge state (2+, 3+, and 4+). Separate histograms were created for matches to forward sequences and for matches to reversed sequences for all peptides of seven amino acids or longer. The score histograms of reversed matches were used to estimate peptide false discovery rates (FDR) and set score thresholds for each peptide class. The overall peptide FDR for the analysis was 2.67%, and the overall protein FDR was 0.6%.

LC-MS/MS Target Validation by Western Blotting

Samples were processed exactly as for LC-MS/MS experiment only that ⅕ of the volumes were used, and procedure was stopped after final bead wash after immunoprecipitation. The enriched biotinylated proteins were eluted by suspending them in 2× Laemmli sample buffer supplemented with 5 mM biotin and boiled at 95° C. for 5 min.

SDS-PAGE, Wester Blotting and Quantification

Samples were run on 10% or 12% acrylamide gels for ~1 h at 180 V in Mini-PROTEAN Tetra cell (Biorad). The proteins were then transferred onto nitrocellulose membranes using Trans-Blot Turbo system (Biorad), the membranes were blocked with 5% milk in PBST for 1 h RT and then probed overnight at 4° C. for pan-ADP-ribose (1:1000; Cell signaling technology cat #83732), PARP-1 (1:3000; Cell signaling technology cat #9532), PARP-10 (1:1000;

Bethyl laboratories cat # A300-665A), Psmc2 (1:1000; Bethyl laboratories cat # A303-822A), AK1 (1:500; Proteintech cat #14978-1-AP), AK2 (1:1000; Proteintech cat #11014-1-AP), CTBP1 (1:1000; Bethyl laboratories cat # A300-338A) or MRPP1 (1:500; Bethyl laboratories cat # A304-390A). Anti-streptavidin-horseradish peroxidase (1:5000; Jackson Immuno research laboratories cat # 016-030-084) was incubated for 25 min RT. Rabbit secondary antibody was from Jackson Immuno research laboratories (cat #111-035-144). Membranes were developed with ECL Western Blotting Substrate (Thermo Scientific) using Biorad ChemiDoc MP. Band intensities we quantified with ImageJ.

Differential Scanning Fluorimetry (DSF)

Differential scanning fluorimetry was used to detect the AK1-ligand interaction. Experiments were performed with 0.1 mg/mL AK1 (Novus Biologicus cat # NBP1-50855) in 100 mM NaCl, 50 mM HEPES [pH 7.4], 4 mM $MgCl_2$, and 7.5× SYPRO ORANGE (Life technologies cat # S6650). AK1 thermal stability upon treatment with $ddH_2O$, ATP, ADP, $NAD^+$ or NADH, 1 mM each, was measured on Biorad RT-PCR thermocycler using Cal Orange 560 filter. The thermocycler settings for melting curve determination were as follows: 2 min hold at 20° C., ramp from 20° C. to 99° C. (increment 0.5° C. for 30 s) and then hold at 99° C. for 2 min. The melting temperature ($T_m$) for each sample was determined by calculating first derivative of the fluorescence (d(RFU)/dT) and shift in thermal stability ($\Delta T_m$) was calculated by subtracting vehicle—treated sample $T_m$ from ligand-treated sample $T_m$.

Scheme S1: Synthesis of 2-Diaziridyl alkyl AMP morpholidate

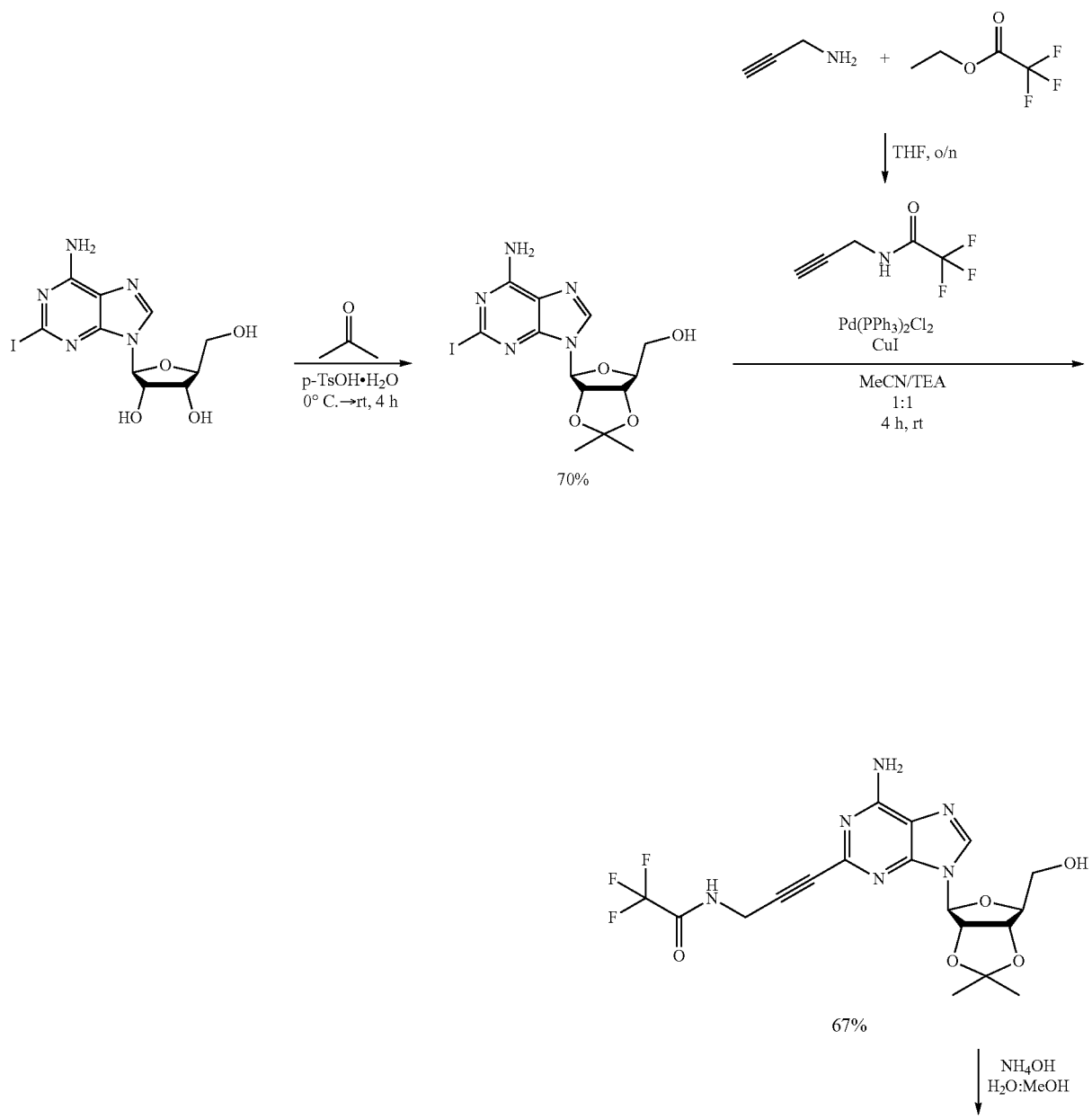

15
16
-continued
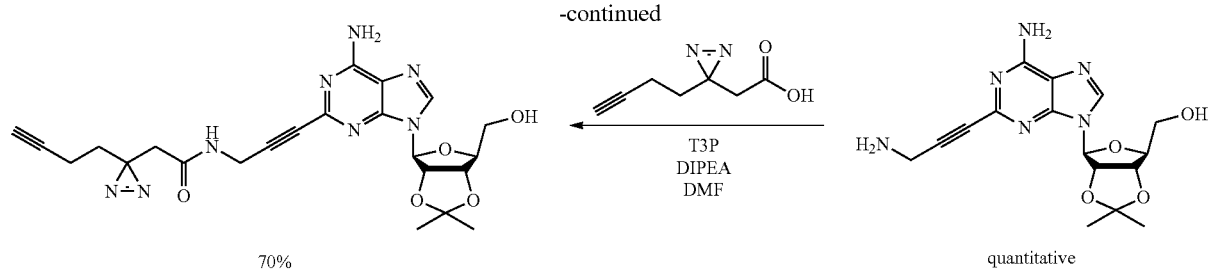
70% quantitative
POCl₃
TEA, THF
0° C., 20 mins
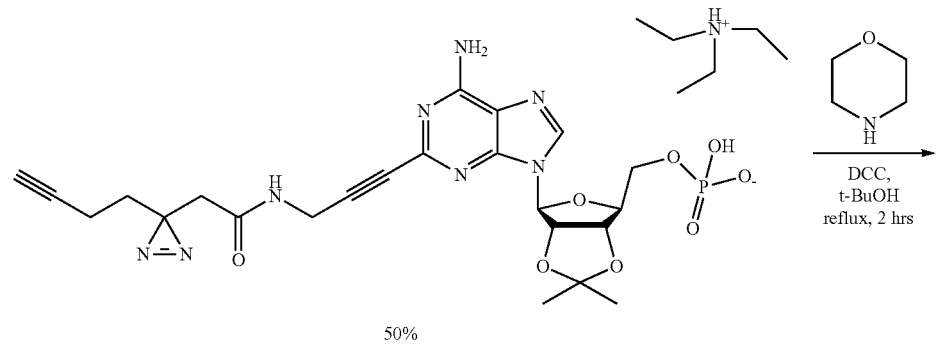
50%
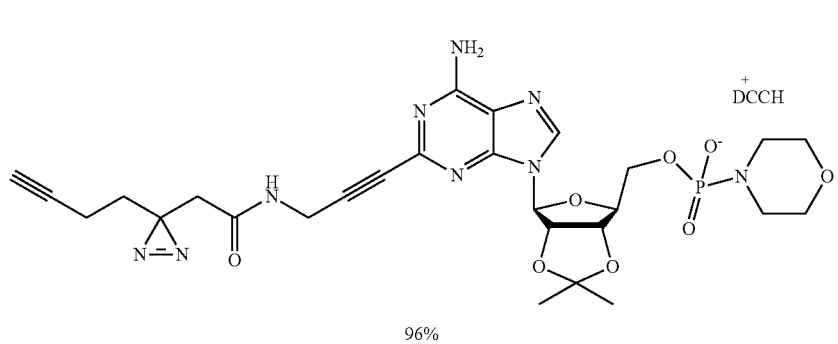
96%
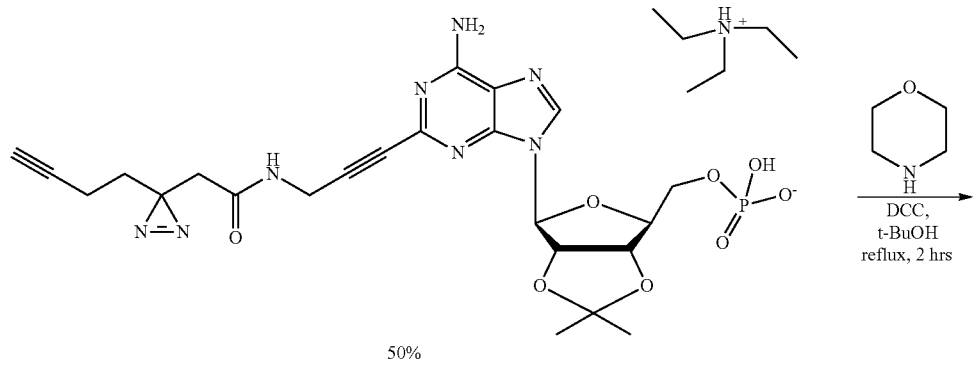
50%

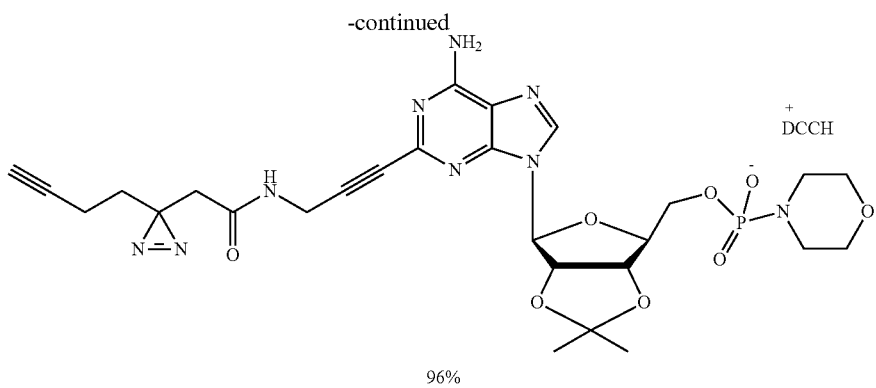
96%
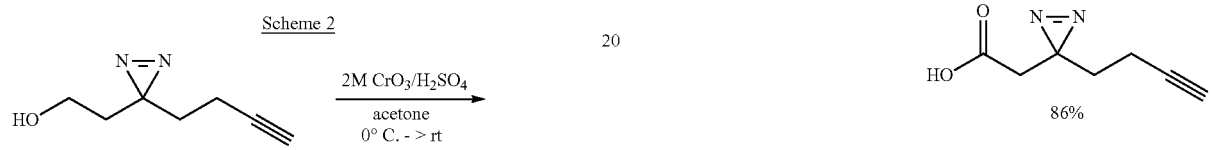
Scheme 4: Synthesis of 2-ad-BAD
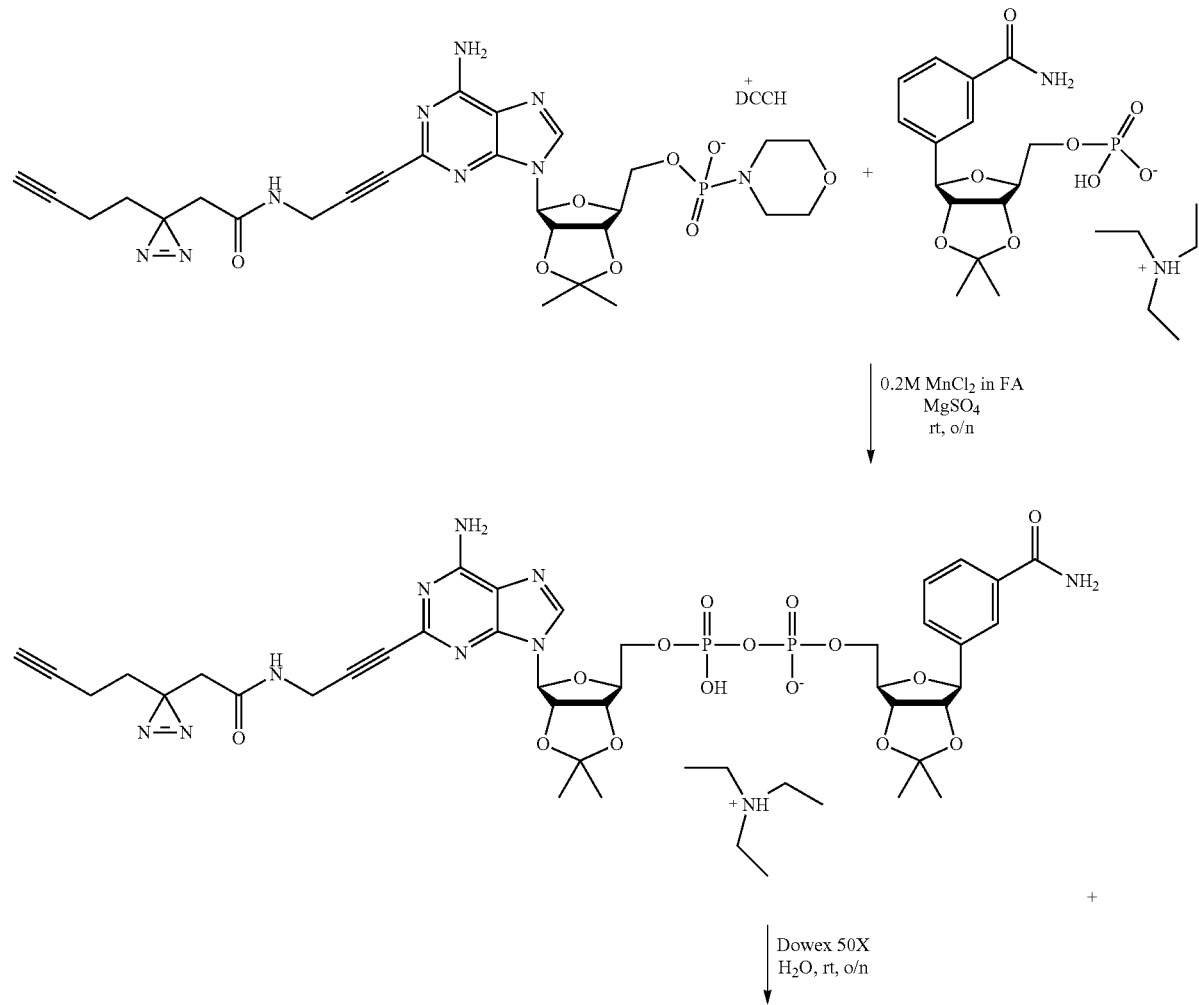

19
20
-continued
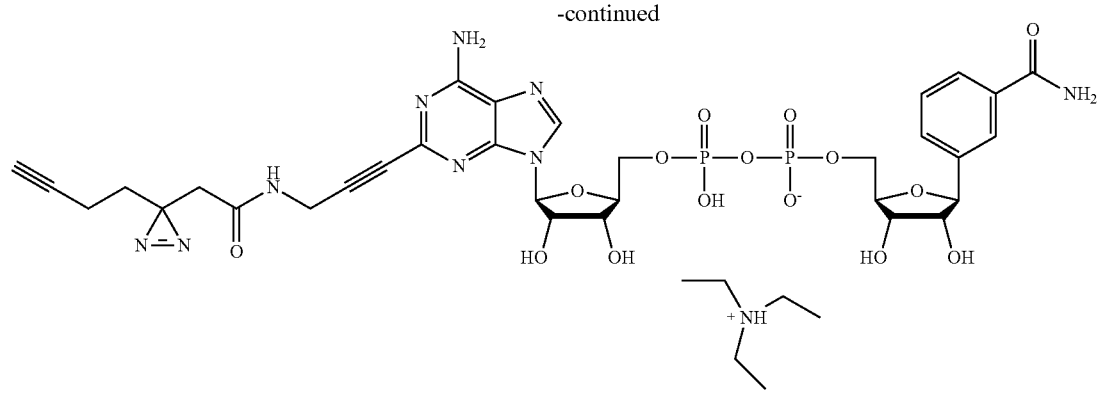
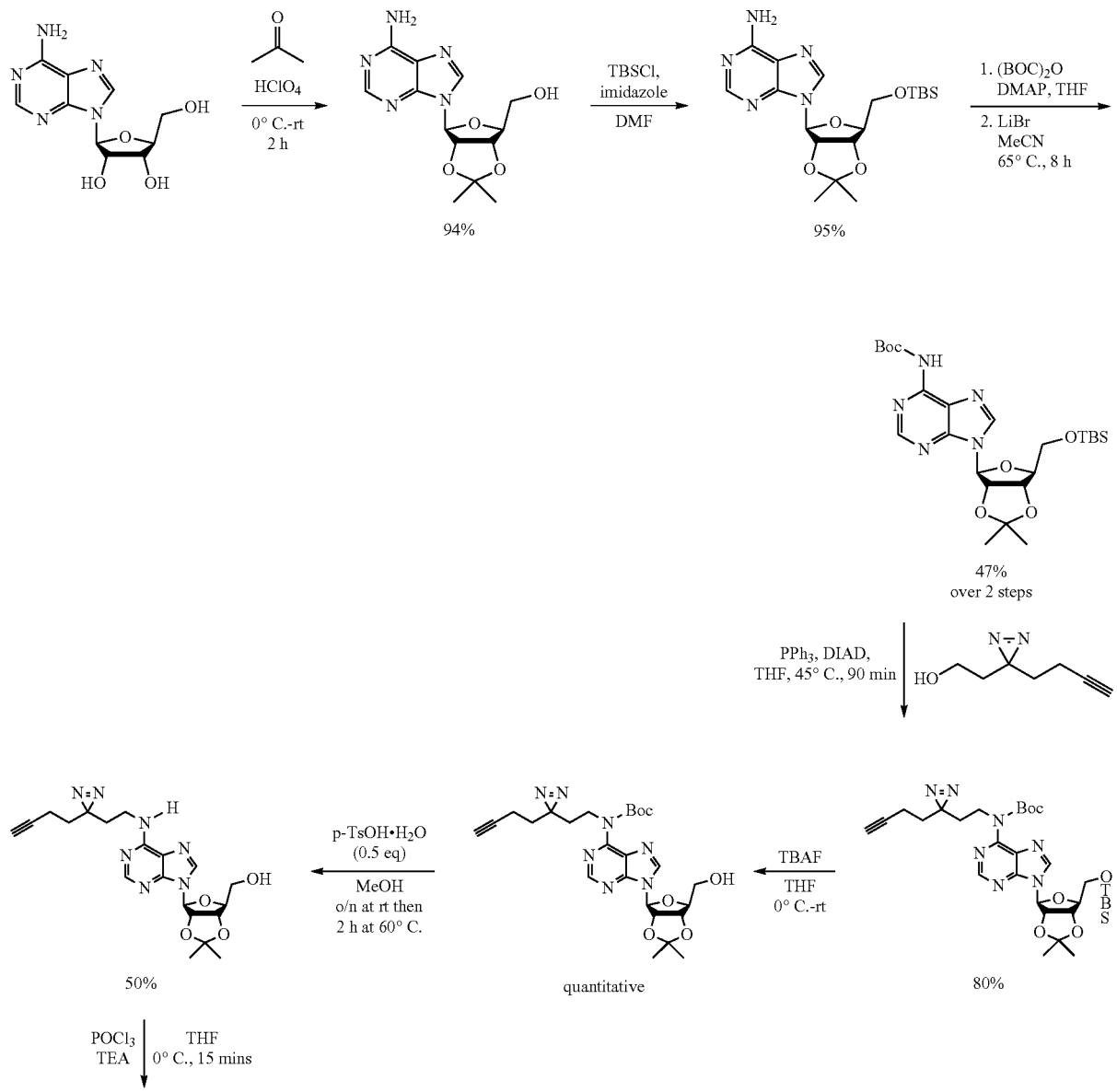

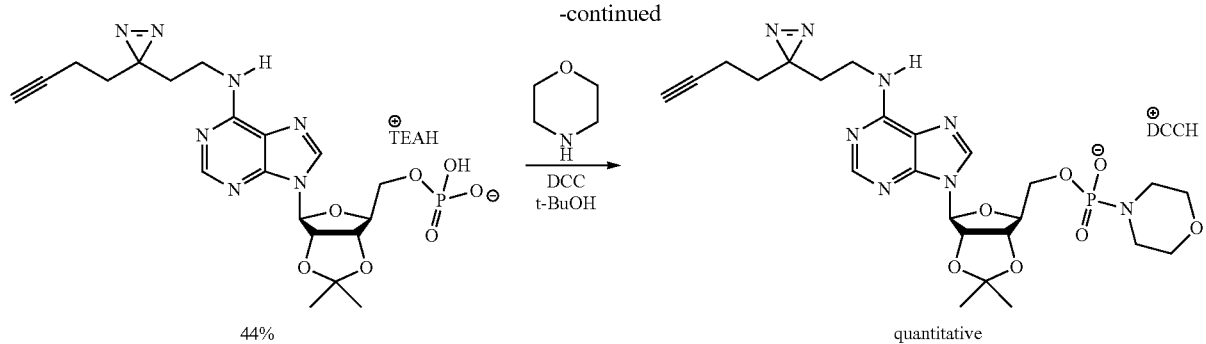
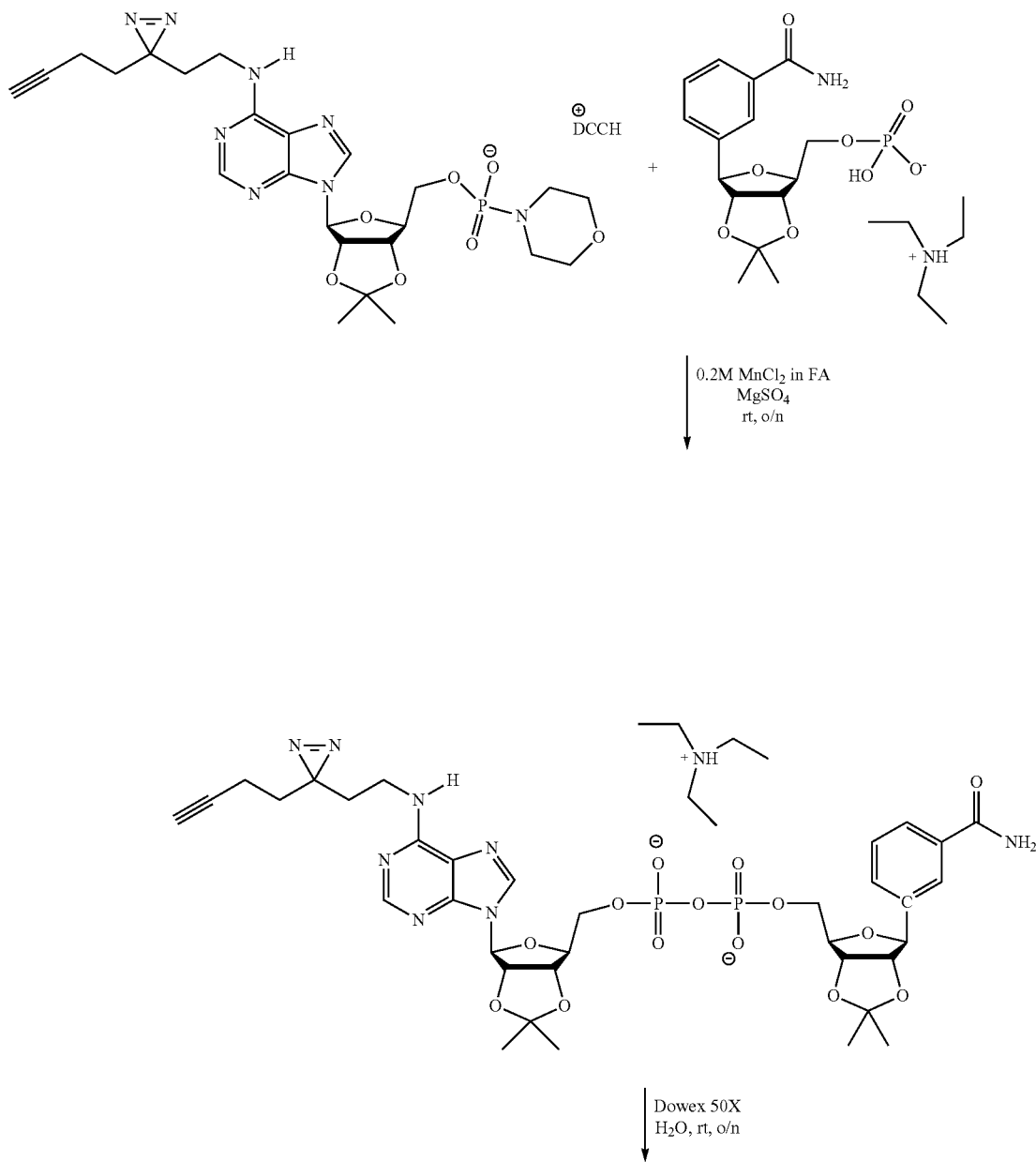
Scheme S6: Synthesis of 6-ad BAD

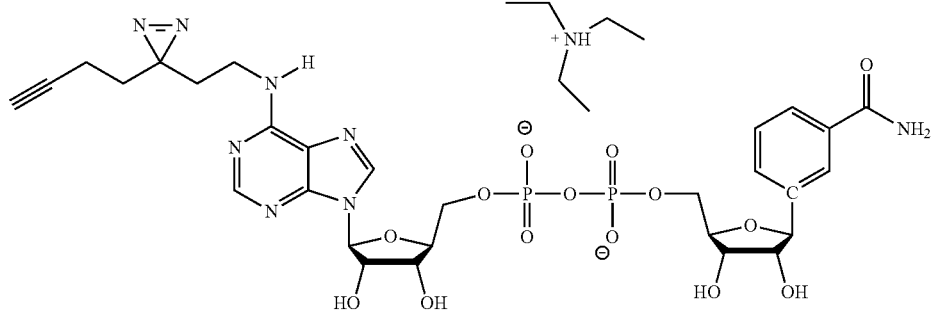
Scheme S7: Synthesis of BAD
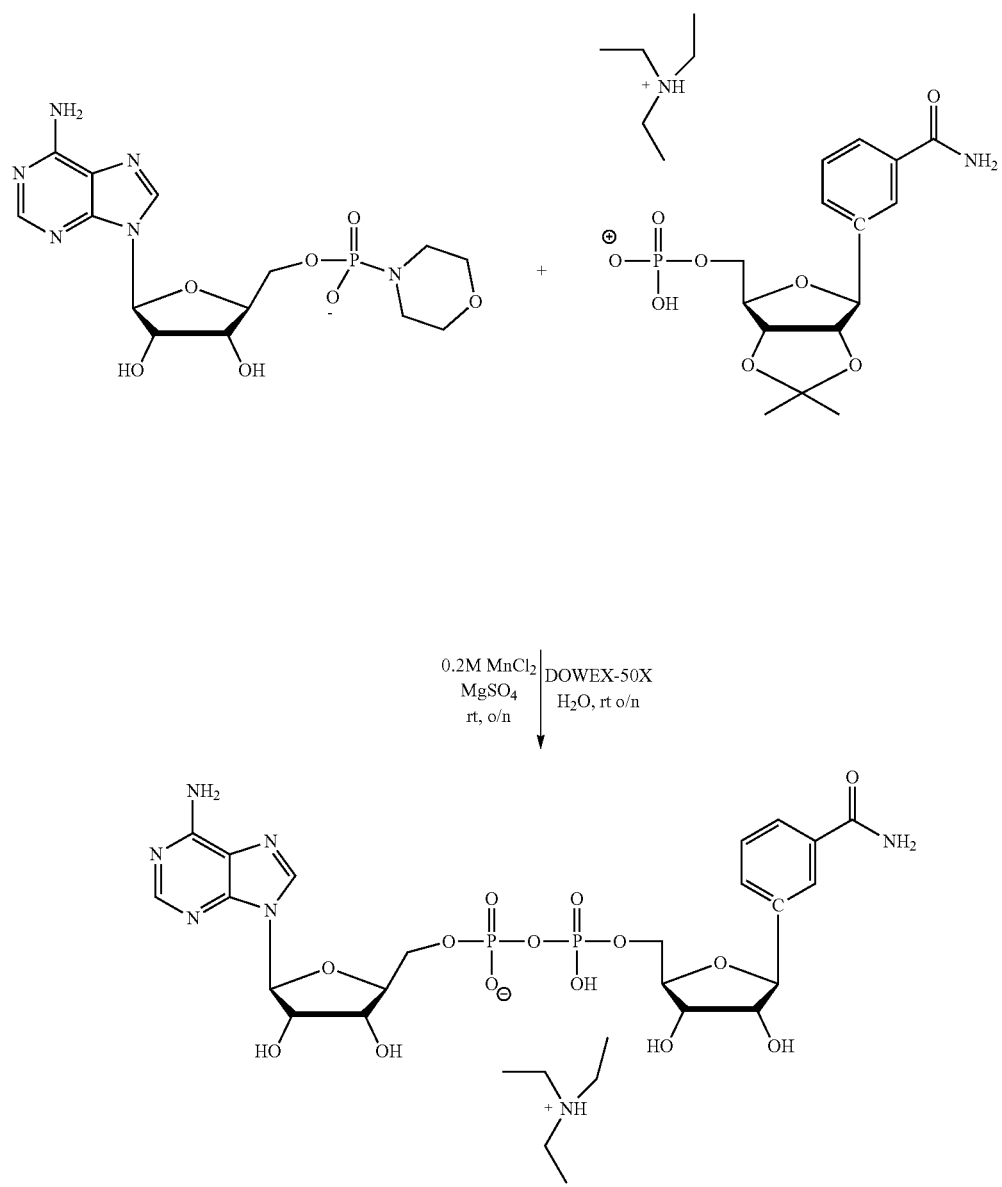

Scheme S8: Synthesis of ad-olaparib

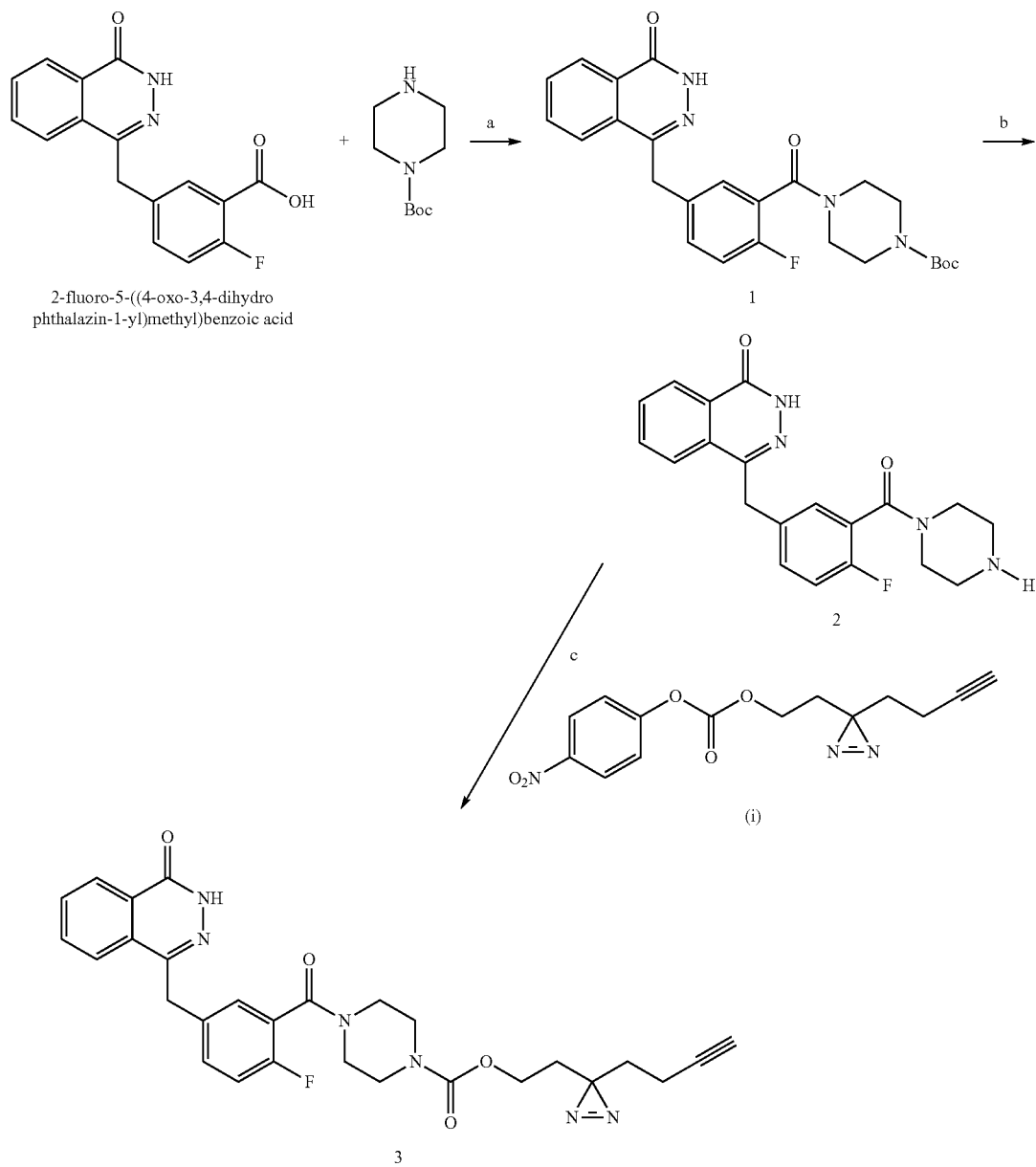

2-fluoro-5-((4-oxo-3,4-dihydro phthalazin-1-yl)methyl)benzoic acid a. Propyl-phosphonic anhydride (T3P), DIPEA, DMF, 84% yield. b. 4N HCl/Dioxane, EtOH, 70% yield. c. i, TEA DMF, O/N, 89% yield Chemical Synthesis Methods and Compound Characterization General Methods $^1$H NMR were recorded on a Bruker DPX spectrometer at 400 MHz. Chemical shifts are reported as parts per million (ppm) downfield from an internal tetramethylsilane standard or solvent references. For air- and water-sensitive reactions, glassware was oven-dried prior to use and reactions were performed under argon. Dichloromethane, dimethylformamide, and tetrahydrofuran were dried using the solvent purification system manufactured by Glass Contour, Inc. (Laguna Beach, Calif.). All other solvents were of ACS chemical grade (Fisher Scientific) and used without further purification unless otherwise indicated. Commercially available starting reagents were used without further purification. Analytical thin-layer chromatography was performed with silica gel 60 F254 glass plates (SiliCycle). Flash column chromatography was conducted with either pre-packed Redisep Rf normal/reverse phase columns Teledyne ISCO) or self-packed columns containing 200-400 mesh silica gel (SiliCycle) on a Combiflash Companion purification system (Teledyne ISCO). High performance liquid chromatography (HPLC) was performed on a Varian Prostar 210 (Agilent) with a flow rate of 20 ml/min using Polaris 5 C18-A columns (150×4.6 mm, 3μm -analytical, 150×21.2 mm, 5 μm-preparative) (Agilent). HPLC analytical conditions: mobile phase (MP) A: 50 mM TEAB buffer (aq), mobile phase (MP) B: Acetonitrile/Methanol; flow rate=1.0 ml/min; UV-Vis detection: λ1=254 nm, λ2=220 nm. All final products were ≥95% purity as assessed by this method. Retention times (tR) and purity refer to UV detection at 220 nm. Low-resolution mass spectra were acquired on an Advion Massexpress.

2-(3-(but-3-yn-1-yl)-3H-diazirin-3-yl)acetic acid

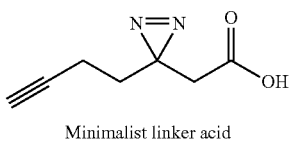

Minimalist linker acid

Synthesized according the literature procedure with minor modifications.[39]

To a stirred solution of 2-(3-But-3-ynyl-3H-diazirin-3-yl)-ethanol (0.070 g, 0.51 mmol, 1 eq.) in acetone (6 mL) at 0° C. Jones reagent (2 M $CrO_3$ in $H_2SO_4$ (aq), 1.0 mL, 2.0 mmol, 4 eq.) was added dropwise. The reaction solution was stirred at room temperature for 2 h. After TLC showed the consumption of starting material, the reaction was quenched with isopropanol (10 mL) and the precipitate formed was separated. The filtrate was passed through celite and washed with acetone (3×10 mL), dried over $MgSO_4$, concentrated in vacuo and redissolved in Ethyl acetate. It was then passed through a silica plug and then concentrated to give the photocrosslinker acid (0.068 g, 89%) as a yellowish oil.

$^1$H NMR (400 MHz, CDCl3) δ 11.91 (s, 1H), 2.06 (dt, J=7.3, 3.6 Hz, 2H), 2.03-1.98 (m, 1H), 1.80 (t, J=7.3 Hz, 2H).

((3aR,4S,6S,6aR)-6-(6-amino-2-iodo-9H-purin-9-yl)-2,2-dimethyltetrahydrofuro[3,4-d][1,3]dioxol-4-yl)methanol

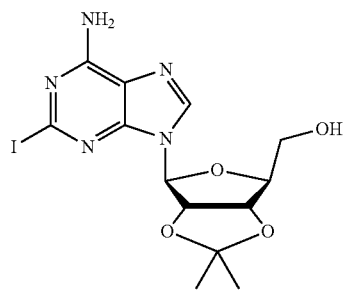

2A-1

2-iodoadenosine (0.906 g, 2.28 mmol) was suspended in acetone (75 mL) and cooled to 0° C. p-TsOH·$H_2O$ (2.17 g, 11.44 mmol, 5 equiv.) was added and stirred the mixture at rt for 4 hrs. Upon completion of the reaction (monitored by TLC), it was quenched and neutralized with sat. $NaHCO_3$ and extracted with ethyl acetate (3×50 mL). The organic layer was passed through silica plug and dried over $MgSO_4$. It was then concentrated and dried under high vacuum to yield an off white solid (0.826 g, 83%).

$^1$H NMR (400 MHz, DMSO) δ 8.28 (s, 1H), 7.74 (s, 2H), 6.05 (d, J=2.7 Hz, 1H), 5.27 (dd, J=6.1, 2.7 Hz, 1H), 5.05 (t, J=5.4 Hz, 1H), 4.93 (dd, J=6.1, 2.8 Hz, 1H), 4.19 (q, J=2.8, 1.4, 0.7 Hz, 1H), 3.54 (td, J=5.2, 2.8 Hz, 2H), 1.54 (s, 3H), 1.33 (s, 3H). LRMS (ESI) m/z [M]$^+$ calculated for $C_{13}H_{16}IN_5O_4$ 433.0, observed 433.2.

N-(3-(6-amino-9-((3aR,4S,6S,6aR)-6-(hydroxymethyl)-2,2-dimethyltetrahydrofuro[3,4-d][1,3]dioxol-4-yl)-9H-purin-2-yl)prop-2-yn-1-yl)-2,2,2-trifluoroacetamide

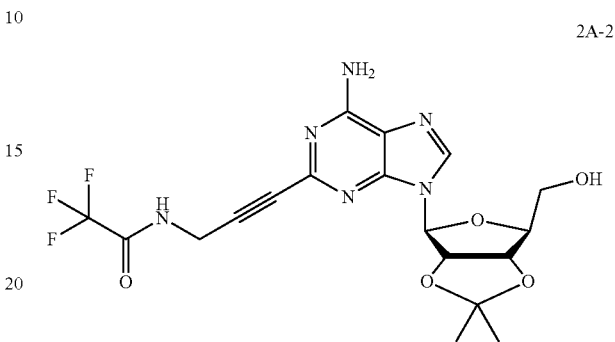

2A-2

To a solution of 2A-1 (0.264 g, 0.60 mmol) in anhydrous acetonitrile (6.0 mL) under Argon were added Pd(PPh$_3$)$_2$Cl$_2$ (14 mg, 0.012 mmol) and CuI (12 mg, 0.024 mmol). The reaction flask was evacuated and refilled with argon three times, and stirred for 10 mins before adding Triethylamine (6.0 mL). N-propargyl trifluoroacetamide (0.282 g, 1.8 mmol) was added after 10 mins and stirred the mixture at room temperature for 5 h. Upon completion of the reaction (monitored by TLC), the mixture was concentrated and the crude residue was purified via a Combiflash Companion system (EtOAc/MeOH). Fractions containing the desired product were collected and concentrated in vacuo to yield the product as an amorphous pale yellow solid (0.18 g, 67%).

$^1$H NMR (400 MHz, CDCl$_3$) δ 7.89 (s, 1H), 6.07 (d, J=10.3 Hz, 1H), 5.91 (s, 1H), 5.83 (d, J=4.9 Hz, 1H), 5.24 (s, 1H), 5.23-5.16 (m, 2H), 5.14 (d, J=6.0 Hz, 1H), 4.53 (s, 1H), 4.18 (d, J=4.4 Hz, 2H), 4.00 (d, J=12.7 Hz, 1H), 3.80 (t, J=11.1 Hz, 1H), 3.49 (s, 1H), 1.64 (s, 3H), 1.38 (s, 3H). LR-MS (ESI) m/z [M]$^+$ calculated for $C_{18}H_{19}F_3N_6O_5$ 456.1, observed 457.0

((3aR,4S,6S,6aR)-6-(6-amino-2-(3-aminoprop-1-yn-1-yl)-9H-purin-9-yl)-2,2-dimethyltetra hydrofuro[3,4-d][1,3] dioxol-4-yl)methanol

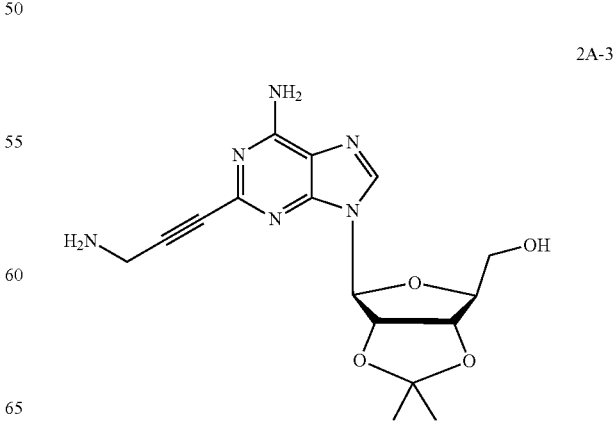

2A-3

2A-2 (0.17 g, 0.37 mmol) was dissolved in MeOH (2.0 mL) and added aqueous NH₄OH (8.0 mL). Stirred the mixture at room temperature 2.5 hrs. Upon completion of the reaction (monitored by TLC), all the solvents were evaporated and further co-evaporated with acetonitrile to yield the product as off-white solid (quantitative yield).

$^1$H NMR (400 MHz, MeOD) δ 8.37 (s, 1H), 6.13 (s, 1H), 5.22 (s, 1H), 5.05 (s, 1H), 4.40 (s, 1H), 4.02 (s, 1H), 3.88-3.69 (m, 2H), 1.62 (s, 3H), 1.38 (s, 3H). Missing peaks due to overlapping peaks with H₂O.). LR-MS (ESI) m/z [M]⁺ calculated for $C_{16}H_{20}N_6O_4$ 360.2, observed 360.8.

N-(3-(6-amino-9-((3aR,4S,6S,6aR)-6-(hydroxymethyl)-2,2-dimethyltetrahydrofuro[3,4-d][1,3]dioxol-4-yl)-9H-purin-2-yl)prop-2-yn-1-yl)-2-(3-(but-3-yn-1-yl)-3H-diazirin-3-yl)acetamide

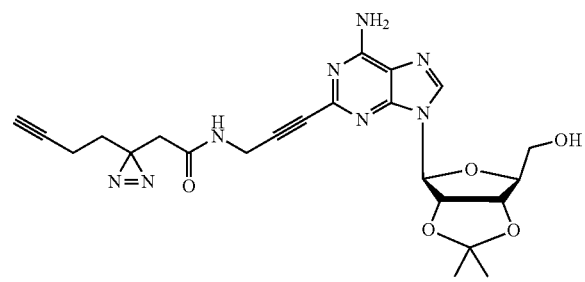

2A-4

Amine 2A-3 (0.136 g, 0.37 mmol) and 2-(3-(but-3-yn-1-yl)-3H-diazirin-3-yl)acetic acid (0.069 g, 0.45 mmol, 1.2 equiv.) were dissolved in anhydrous DMF (2.7 mL) and cooled to 0° C. DIPEA 0.13 mL, 2.0 equiv.) and stirred for 5 min, followed by addition of Propyl-phosphonic andydride (T3P) (0.34 mL, 0.56 mmol). The mixture was stirred for 30 min at 0° C. Upon completion of the reaction (monitored by TLC), it was dissolved in ethyl acetate (5 mL) and added with 5% NaHCO₃ (5 mL). The layers were separated and extracted the aqueous layer with ethyl acetate. It was then washed with brine (5 mL) and passed through a silica plug and dried over MgSO₄. The solvent was evaporated and dried under high vacuum to yield the product as an off-white solid (0.128 g, 69%).

$^1$H NMR (400 MHz, CDCl₃) δ 8.01 (s, 1H), 7.28 (s, 1H), 6.61 (s, 2H), 6.39 (s, 1H), 5.85 (d, J=4.7 Hz, 1H), 5.29-5.10 (m, 2H), 4.51 (s, 1H), 4.30-4.26 (m, 2H), 4.04-3.93 (d, J=12.7 Hz 1H), 3.79 (s, 1H), 2.29 (s, 2H), 2.13-1.93 (m, 3H), 1.85-1.77 (m, 2H), 1.63 (s, 3H), 1.37 (s, 3H). LR-MS (ESI) m/z [M]⁺ calculated for $C_{23}H_{26}N_8O_5$ 494.2, observed 494.7.

((3aR,4S,6S,6aR)-6-(6-amino-2-(3-(2-(3-(but-3-yn-1-yl)-3H-diazirin-3-yl)acetamido)prop-1-yn-1-yl)-9H-purin-9-yl)-2,2-dimethyltetrahydrofuro[3,4-d][1,3]dioxol-4-yl)methyl hydrogen phosphate

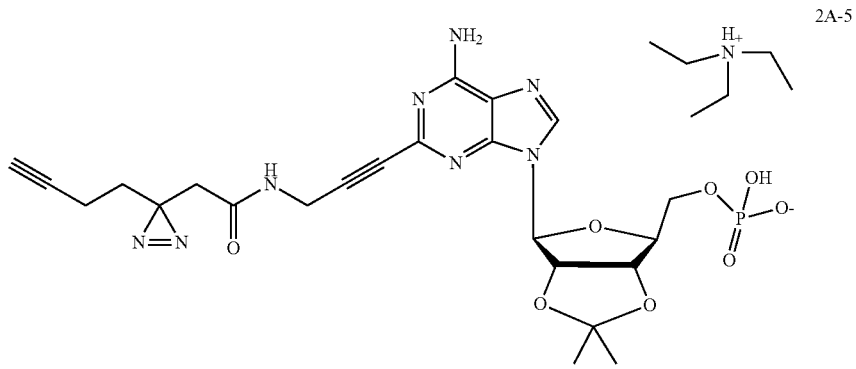

2A-5

A solution of 2A-4 (0.128 g, 0.26 mmol) dissolved in THF (2.6 mL) under argon was cooled to 0° C. and added triethylamine (0.36 mL, 2.6 mmol, 10 equiv.). After stirring for 10 mins, POCl$_3$ (50 µL, 0.51 mmol, 2 equiv.) was added dropwise solution turned cloudy. After 15 mins TLC showed the consumption of starting material. Immediately quenched the reaction with water (1.0 mL) and evaporated the solvents and co-evaporated with acetonitrile to yield a solid. Dissolved the solid in minimum amount of methanol and subjected to C-18 column chromatography using 50 mM TEAB buffer and methanol as the solvent system. The fractions containing the product were pooled together and evaporated the solvent to yield the desired compound 2A-5 (90 mg, 50%).

$^1$H NMR (400 MHz, DMSO) δ 8.80 (t, J=5.1 Hz, 1H), 8.49 (s, 1H), 7.47 (s, 2H), 6.09 (d, J=2.7 Hz, 1H), 5.27 (dd, J=5.9, 2.9 Hz, 1H), 5.02 (d, J=6.0 Hz, 1H), 4.33 (s, 2H), 4.10 (d, J=5.1 Hz, 2H), 3.89-3.73 (m, 2H), 2.80 (t, J=2.6 Hz, 1H), 2.31 (s, 2H), 2.10-1.96 (m, 2H), 1.68 (t, J=7.5 Hz, 2H), 1.53 (s, 3H), 1.31 (s, 3H). LR-MS (ESI) m/z [M]$^+$ calculated for C$_{23}$H$_{27}$N$_8$O$_8$P 574.2, observed 574.8.

((3aR,4S,6S,6aR)-6-(6-amino-2-(3-(2-(3-(but-3-yn-1-yl)-3H-diazirin-3-yl)acetamido)prop-1-yn-1-yl)-9H-purin-9-yl)-2,2-dimethyltetrahydrofuro[3,4-d][1,3]dioxol-4-yl)methyl morpholinophosphonate

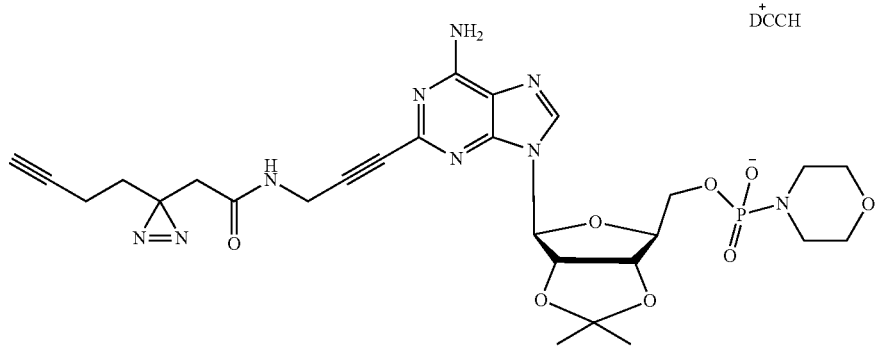

2A-6

2A-5 (90 mg, 0.13 mmol) was dissolved in t-BuOH (7.0 mL), followed by dropwise addition of morpholine (60 µL, 5.0 equiv). The reaction mixture was first stirred at RT for 15 min and then refluxed. Dicyclohexylcarbodiimide (DCC, 0.11 g, 4.0 equiv) was dissolved in t-BuOH (3.5 mL) and divided into 10 aliquots. An aliquot was added dropwise to the reaction mixture under reflux every ten minutes. After 2 h, DCC addition was complete and reflux was continued for another 5 min. After reaction was completed, (as determined by MS analysis) the mixture was cooled and concentrated under vacuum. Addition of ether formed a precipitate, then the ether was decanted and fresh ether was added to wash the precipitate. The precipitate was dried under high vacuum to form 2A-6 as an off-white powder (0.116 g, 96%).

$^1$H NMR (400 MHz, D$_2$O) δ 8.31 (s, 1H), 6.18 (s, 1H), 5.42 (d, J=6.1 Hz, 1H), 5.13 (d, J=6.1 Hz, 1H), 4.16 (s, 2H), 3.94-3.83 (m, 4H), 3.72 (s, 2H), 3.35 (d, J=4.2 Hz, 5H), 3.28-3.15 (m, 4H), 2.62 (d, J=4.6 Hz, 3H), 2.41 (s, 2H), 2.29 (d, J=2.6 Hz, 1H), 2.02 (dt, J=7.1, 3.5 Hz, 2H), 1.71 (t, J=7.2 Hz, 2H), 1.60 (s, 3H), 1.40 (s, 3H). LR-MS (ESI) m/z [M]$^+$ calculated for C$_{27}$H$_{34}$N$_9$O$_8$P 643.2, observed 643.7.

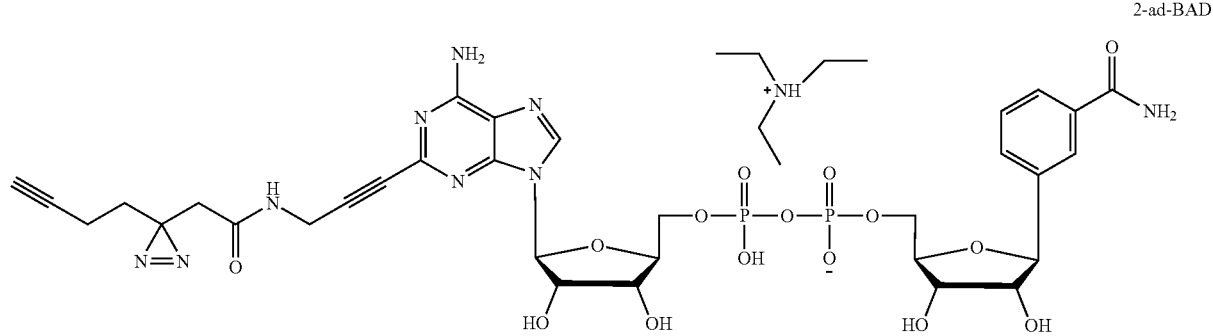

2-ad-BAD 2-diaziridylalkyne AMP-morpholidate 2A-6 (47 mg, 0.05 mmol), B4 (92 mg, 0.11 mmol, 2.1 equiv), and MgSO₄ (13 mg, 0.1 mmol, 2.0 equiv) were dissolved in a solution of MnCl₂ (0.5 ml, 0.2 M in formamide) and stirred at room temperature for overnight. After the completion of the coupling reaction monitored by MS, H₂O (4.0 mL) was added. To this mixture) was added DOWEX 50× (1.0 g) and the mixture was stirred overnight at RT. After the complete deprotection of acetonide groups (monitored by MS), the resin was filtered off and the aqueous solution was concentrated to dryness. Methanol (5 mL) was added to form a cloudy suspension and the reaction was centrifuged to separate the precipitate. The methanol layer was then evaporated to dryness and the resultant solid was further washed with acetone (4.0 mL) and decanted. The solid was again resuspended in methanol and the crude product was purified via preparative HPLC using 50 mM TEAB buffer and acetonitrile. The fraction containing the product were pooled and concentrated to yield the product as TEA salt (4.2 mg).

¹H NMR (400 MHz, MeOD) δ 8.60 (s, 1H), 8.07 (s, 1H), 7.80 (d, J=8.0 Hz, 1H), 7.58 (d, J=7.5 Hz, 1H), 7.41 (t, J=7.7 Hz, 1H), 6.04 (d, J=4.9 Hz, 1H), 4.56 (t, J=4.7 Hz, 1H), 4.49 (t, J=4.8 Hz, 1H), 4.30 (m, 3H), 4.16 (s, 1H), 4.03-3.96 (m, 1H), 2.36 (s, 2H), 2.29 (t, J=2.7 Hz, 1H), 2.09 (td, J=7.4, 2.6 Hz, 2H), 1.76 (t, J=7.5 Hz, 2H). LR-MS (ESI) m/z [M]⁺ calculated for $C_{32}H_{37}N_9O_{15}P_2$ 849.2, observed 849.4.

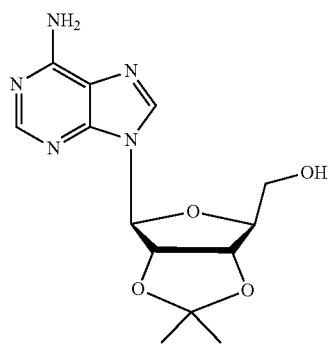

6A-1

To a solution of adenosine (6.68 g, 25.0 mmol) in 500 mL of acetone was treated with perchloroic add (3.0 mL, 70% in water) at 0° C. then stirred at room temperature for 2 h. The resulting solution was neutralized with Na₂CO₃ at 0° C. and the resulting white solid removed by filtration. The filtrate was concentrated under reduced pressure to yield acetonide (4.67 g, 95%).

¹H NMR (400 MHz, DMSO) δ 8.25 (s, 1H), 8.07 (s, 1H), 6.03 (d, J=3.0 Hz, 1H), 5.25 (dd, J=6.1, 3.1 Hz, 2H), 5.16 (s, 1H), 4.87 (dd, J=6.1, 2.4 Hz, 2H), 4.12 (q, J=4.6 Hz, 2H), 3.45 (qd, J=11.7, 4.8 Hz, 3H), 1.45 (s, 3H), 1.23 (s, 3H).

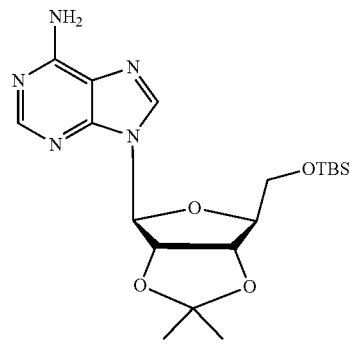

6A-2

To a solution 6A-1 (1.84 g, 6.0 mmol) in 6 mL of DMF and imidazole (1.02 g, 5 mmol) at 0° C. was added t-butyldimethylsilyl chloride (1.18 g, 7.8 mmol) under N² atmosphere. The reaction mixture was stirred at room temperature for overnight and quenched with water. Extracted with the aqueous mixture with DCM (50 ml×3) and dried over MgSO₄. Evaporated all the solvent to yield pure product (2.39 g, 95%).

¹H NMR (400 MHz, CDCl₃) δ 8.37 (s, 1H), 8.12 (s, 1H), 6.25 (s, 2H), 6.16 (d, J=2.4 Hz, 1H), 5.21 (dd, J=6.1, 2.4 Hz, 1H), 4.92 (dd, J=6.1, 2.3 Hz, 1H), 3.88 (dd, J=11.3, 3.6 Hz, 1H), 3.76 (dd, J=11.3, 3.9 Hz, 1H), 1.62 (s, 3H), 1.39 (s, 3H), 0.82 (s, 9H), −0.02 (d, J=0.9 Hz, 6H).

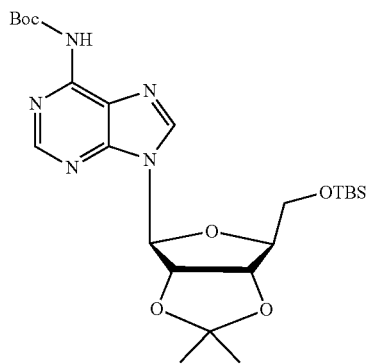

6A-3

To a solution of 6A-2 (0.61 g, 1.46 mmol) in dry THF (8.0 ml) was added Di-tert-butyl dicarbonate (0.96 g, 4.38 mmol, 3.0 equiv.) and DMAP (0.036 g, 0.29 mmol, 0.2 equiv.). The mixture was stirred at room temperature for 4 h. After the reaction was completed monitored by TLC. It was then quenched with water and extracted Ethyl acetate (50 mL×3) and dried over MgSO₄ and concentrated. The crude was then dissolved in dry MeCN and treated with LiBr (0.38 g, 4.38 mmol, 3 equiv.). The mixture was stirred at 65° C. for 8 hrs. Evaporated and the solvent and the crude residue was purified via a Combiflash Companion system (EtOAc/Hexanes) to isolate the product as off white crystalline solid (0.36 g, 47% in 2 steps).

¹H NMR (400 MHz, CDCl₃) δ 8.81 (s, 1H), 8.27 (s, 1H), 6.22 (d, J=2.4 Hz, 1H), 5.26 (dd, J=6.1, 2.4 Hz, 1H), 4.93 (dd, J=6.1, 2.2 Hz, 1H), 4.49 (q, J=3.4 Hz, 1H), 3.90 (dd, J=11.3, 3.4 Hz, 1H), 3.78 (dd, J=11.3, 3.8 Hz, 1H), 1.64 (s, 3H), 1.57 (s, 9H), 1.41 (s, 3H), 0.82 (s, 9H), 0.00 (s, 6H).

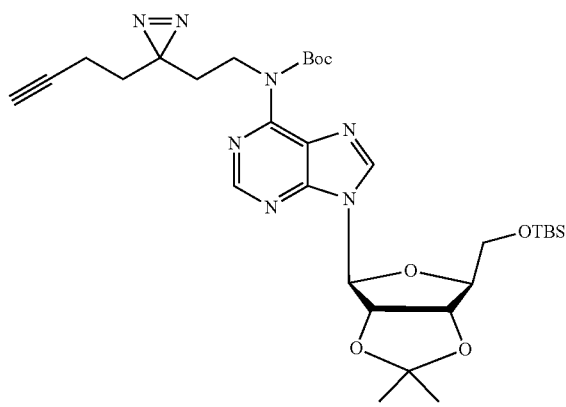

6A-4

6A-3 (0.57 g, 1.09 mmol) was dissolved in dry THF and were added PPh₃ (0.43 g, 1.63 mmol) and 2-(3-(but-3-yn-1-yl)-3H-diazirin-3-yl)ethan-1-ol (0.22 g, 1.63 mmol). Stirred the mixture at 45° C. for 2 mins and then added DIAD (0.33 ml, 1.63 mmol) in 30 secs. After stirring the mixture at 45° C. for 1 h TLC showed the completion of reaction. Evaporated the solvent and the crude residue was purified via a Combiflash Companion system (EtOAc/Hexanes) to yield the product (0.66 g, 95%).

¹H NMR (400 MHz, CDCl₃) δ 8.71 (s, 1H), 8.25 (s, 1H), 6.20 (d, J=2.6 Hz, 1H), 5.19 (dd, J=6.2, 2.6 Hz, 1H), 4.98-4.89 (m, 1H), 4.39 (q, J=3.9 Hz, 1H), 3.99-3.90 (m, 2H), 3.85 (dd, J=11.2, 3.9 Hz, 1H), 3.75 (dd, J=11.2, 4.2 Hz, 1H), 1.97 (td, J=7.5, 2.5 Hz, 3H), 1.90 (t, J=2.6 Hz, 1H), 1.81-1.72 (m, 2H), 1.66 (qd, J=7.9, 7.4, 4.8 Hz, 2H), 1.61 (s, 3H), 1.43 (s, 9H), 1.37 (s, 3H), 0.83 (s, 9H), -0.00 (d, J=3.6 Hz, 6H).

LR-MS (ESI) m/z [M+H]⁺ calculated for $C_{31}H_{48}N_7O_6Si$ 642.34, observed 642.10.

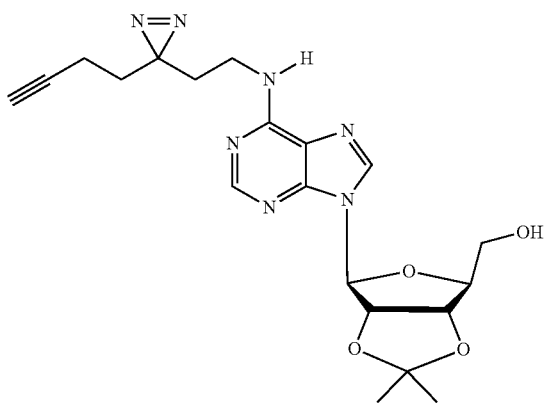

6A-5

6A-4 (0.53 g, 0.82 mmol) and p-TsOH·H₂O (0.41 g, 0.5 equiv.) were dissolved in dry MeOH (6 mL) and stirred the mixture at room temperature overnight to remove the TBS group and for 2 hrs at 60° C. to remove the Boc group. After the complete deprotection monitored by TLC, the crude residue was purified via a Combiflash Companion system (EtOAc/Hexanes) to yield the product (0.085 g, 25%).

¹H NMR (400 MHz, CDCl₃) δ 8.32 (s, 1H), 7.81 (s, 1H), 6.07 (s, 1H), 5.84 (d, J=4.9 Hz, 1H), 5.19 (t, J=5.4 Hz, 1H), 5.12-5.08 (dd, J=12.6, 1.4 Hz, 1H), 4.53 (s, 1H), 3.97 (dd, J=12.8, 1.4 Hz, 1H), 3.78 (d, J=12.7 Hz, 1H), 3.60-3.44 (m, 2H), 2.06-1.97 (m, 3H), 1.86 (t, J=6.9 Hz, 2H), 1.68 (t, J=7.2 Hz, 2H), 1.64 (s, 3H), 1.37 (s, 3H).

LR-MS (ESI) m/z [M+H]⁺ calculated for $C_{20}H_{26}N_7O_4$ 428.2, observed 428.0.

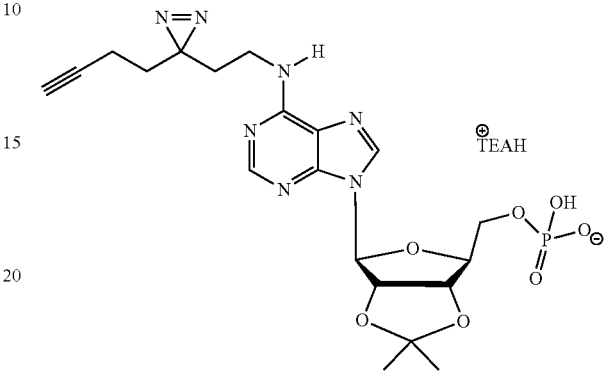

6A-6

A solution of 6A-5 (0.0837 g, 0.19 mmol) dissolved in THF (2.0 mL) under argon was cooled to 0° C. and added triethylamine (0.27 mL, 1.9 mmol, 10 equiv.). After stirring for 10 mins, POCl₃ (40 μL, 0.4 mmol, 2 equiv.) was added dropwise solution turned cloudy. After 15 mins TLC showed the consumption of starting material. Immediately quenched the reaction with water (1.0 mL) and evaporated the solvents and co-evaporated with acetonitrile to yield a solid. Dissolved the solid in minimum amount of methanol and subjected to C-18 column chromatography using 50 mM TEAB buffer and methanol as the solvent system. The fractions containing the product were pooled together and evaporated the solvent to yield the desired compound 6A-6 (0.052 g, 44%).

¹H NMR (400 MHz, CDCl₃) δ 8.33 (s, 1H), 8.22 (s, 1H), 6.79 (s, 1H), 6.12 (d, J=2.7 Hz, 1H), 5.04 (s, 1H), 4.81 (m, 1H), 4.39 (s, 1H), 4.03-3.91 (m, 2H), 3.38 (s, 2H), 1.91-1.88 (m, 2H) overlapped, 1.72 (t, J=7.0 Hz, 2H), 1.56 (t, J=7.2 Hz, 2H), 1.48 (s, 3H), 1.21 (s, 3H).

LR-MS (ESI) m/z [M]⁺ calculated for $C_{20}H_{26}N_7O7P$ 507.16, observed 507.80.

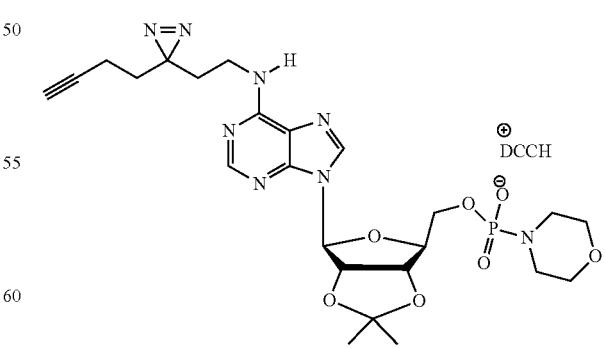

6A-7

6A-6 (0.052 g, 0.086 mmol) was dissolved in t-BuOH (5.0 mL), followed by dropwise addition of morpholine (40 μL, 0.43 mmol, 5.0 equiv). The reaction mixture was first stirred at RT for 15 min and then refluxed. Dicyclohexylcarbodiimide (0.072 g, 0.34 mmol, 4.0 equiv) was dissolved in t-BuOH (3.5 mL) and divided into 10 aliquots. An aliquot was added dropwise to the reaction mixture under reflux every ten minutes. After 2 h, DCC addition was complete and reflux was continued for another 5 min. After reaction was completed, (as determined by MS analysis) the mixture was cooled and concentrated under vacuum. Addition of ether formed a precipitate, then the ether was decanted and fresh ether was added to wash the precipitate. The precipitate was dried under high vacuum to form 6A-7 as an off-white powder in quantitative yield. The crude was used in the coupling step without further purification.

LR-MS (ESI) m/z [M]+ calculated for $C_{24}H_{33}N_8O_7P$ 576.22, observed 576.80.

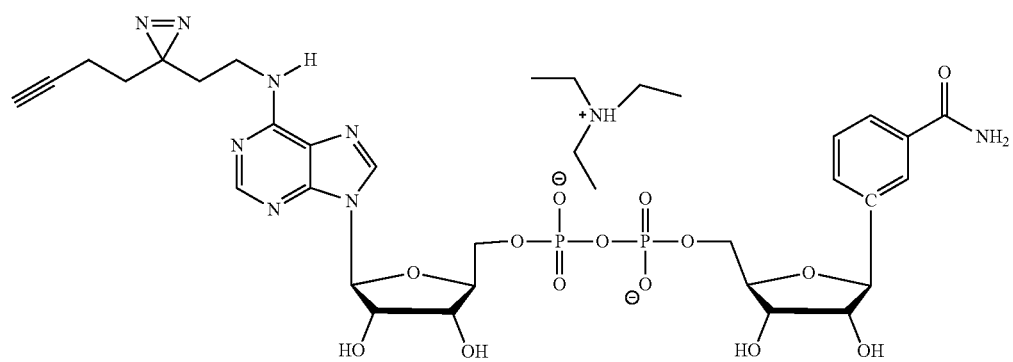

6-diaziridylalkyne AMP-morpholidate 6A-7 (0.074 g, 0.05 mmol), B4 (0.134 g, 0.17 mmol, 2.0 equiv), and MgSO4 (24 mg, 0.17 mmol, 2.0 equiv) were dissolved in a solution of MnCl2 (2.0 ml, 0.2 M in formamide) and stirred at room temperature for overnight. After the completion of the coupling reaction monitored by MS, H2O (4.0 mL) was added. To this mixture) was added DOWEX 50× (1.0 g) and the mixture was stirred overnight at RT. After the complete deprotection of acetonide groups (monitored by MS), the resin was filtered off and the aqueous solution was concentrated to dryness. Methanol (5 mL) was added to form a cloudy suspension and the reaction was centrifuged to separate the precipitate. The methanol layer was then evaporated to dryness and the resultant solid was further washed with acetone (4.0 mL) and decanted. The solid was again resuspended in methanol and the crude product was purified via preparative HPLC using 50 mM TEAB buffer and acetonitrile. The fraction containing the product were pooled and concentrated to yield the product as TEA salt (2.4 mg).

1H NMR (400 MHz, D2O) δ 8.21 (s, 1H), 8.07 (s, 1H), 7.58 (s, 1H), 7.47 (d, J=7.2 Hz, 1H), 7.38 (s, 1H), 7.22 (s, 1H), 6.07 (s, 1H), 5.95 (s, 1H), 4.16 (s, 6H), 3.92 (s, 2H), 3.55-3.53 (m, 2H), 3.41 (s, 2H) 3.30 (dd, J=15.7, 8.6 Hz, 2H), 2.25-2.14 (m, 2H), 1.94-1.90 (m, 2H), 1.83-1.77 (m, 3H), 1.62 (m, 2H). Peaks missing are due to overlapping signal of D2O. LR-MS (ESI) m/z [M]+ calculated for $C_{29}H_{35}N_8O_{14}P_2$ 782.18, observed 782.80.

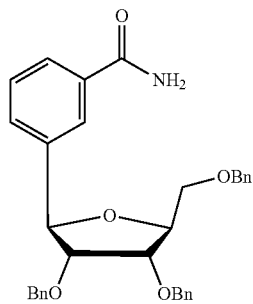

This compound was prepared using previously published procedure[40].

1H NMR (400 MHz, CDCl3) δ 7.82-7.76 (m, 2H), 7.53 (d, J=7.6 Hz, 1H), 7.43-7.16 (m, 17H), 5.78 (s, 1H), 5.38 (s, 1H), 5.09 (d, J=6.4 Hz, 1H), 4.76-4.43 (m, 7H), 4.42-4.35 (m, 1H), 4.09 (t, J=4.6 Hz, 1H), 3.87-3.82 (m, 1H), 3.78 (dd, J=10.5, 3.7 Hz, 1H), 3.68 (dd, J=10.5, 3.4 Hz, 1H).

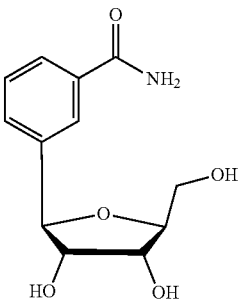

This compound, 3-((2R,3S,4R,5S)-3,4-dihydroxy-5-(hydroxymethyl)tetrahydrofuran-2-yl)benzamide, was prepared using previously published procedure[41].

B1 (0.98 g, 1.88 mmol) was dissolved in dry DCM (38 mL) under nitrogen at −78° C. and a 1N solution of BBr3 in DCM (7.6 mL) was added slowly. The reaction was stirred for 1 hour at −78° C. and then overnight warming to room temperature. The reaction was quenched with a mixture of Et2O and MeOH (4/1, 40 mL), stirred for 20 minutes, and concentrated. The crude residue was purified via a Combiflash Companion system using DCM-MeOH (4:1). Fractions containing the desired product were treated with charcoal and filtered through celite pad which was then concentrated to yield a white solid (0.417 g, 87%).

$^1$H NMR (400 MHz, DMSO) δ 7.94 (s, 1H), 7.85 (s, 1H), 7.76 (d, J=7.6 Hz, 1H), 7.55 (d, J=7.5 Hz, 1H), 7.40 (t, J=7.6 Hz, 1H), 7.34 (s, 1H), 4.59 (d, J=7.1 Hz, 1H), 3.97-3.87 (m, 2H), 3.83 (d, J=3.7 Hz, 1H), 3.75-3.66 (m, 3H), 3.56 (t, J=5.0 Hz, 2H).

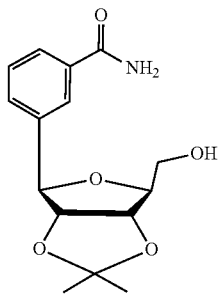

B3

B2 was suspended in acetone (40 mL) and cooled to 0° C. p-TsOH·H$_2$O (1.54 g, 8.09 mmol, 5 equiv.) was added and stirred the mixture at RT overnight. Upon completion of the reaction (monitored by TLC), it was quenched and neutralized with sat. NaHCO$_3$ and the precipitate formed was filtered out and diluted and extracted with CHCl$_3$ (3×50 mL). The organic layer was dried over MgSO$_4$ and then concentrated and dried under high vacuum to yield an off white solid (0.37 g, 80%).

$^1$H NMR (400 MHz, CDCl$_3$) δ 7.85 (s, 1H), 7.65 (d, J=7.8 Hz, 1H), 7.42 (s, 1H), 7.28 (t, J=7.7 Hz, 1H), 6.90 (s, 1H), 6.39 (s, 1H), 4.79 (d, J=5.4 Hz, 1H), 4.67 (dd, J=6.9, 4.1 Hz, 1H), 4.40 (dd, J=6.7, 5.6 Hz, 1H), 4.08 (d, J=2.9 Hz, 1H), 3.83 (d, J=2.7 Hz, 2H), 3.68 (dd, J=12.1, 4.1 Hz, 1H), 1.53 (s, 3H), 1.25 (s, 3H). LR-MS (ESI) m/z [M–H]$^-$ calculated for C$_{15}$H$_{19}$NO$_5^-$ 292.1, observed 292.7.

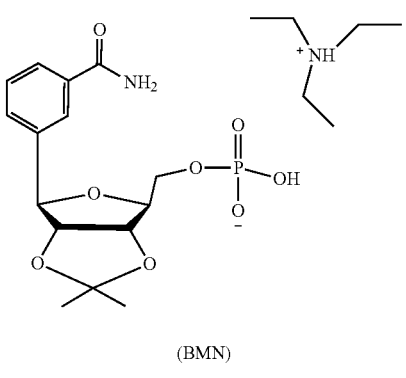

(BMN)

A solution of B3 (0.080 g, 0.27 mmol) dissolved in THF (2.7 mL) under argon was cooled to 0° C. and added triethylamine (0.38 mL, 2.7 mmol, 10 equiv.). After stirring for 10 mins, POCl$_3$ (51 µL, 0.54 mmol, 2 equiv.) was added dropwise solution turned cloudy. After 15 mins TLC showed the consumption of starting material. Immediately quenched the reaction with water (1.0 mL), evaporated the solvents, and co-evaporated with acetonitrile to yield a solid. Dissolved the solid in minimum amount of CHCl$_3$ and subjected to flash column chromatography using DCM/MeOH as the solvent system. The fractions containing the product were pooled together and evaporated the solvent to yield the desired compound (62.6 mg, 49%).

$^1$H NMR (400 MHz, MeOD-d$_1$) δ 7.63 (m, 2H), 7.60 (d, J=7.8 Hz, 1H), 7.52-7.46 (m, 1H), 4.84-4.80 (m, 1H), 4.75 (dt, J=6.7, 3.4 Hz, 1H), 4.48-4.43 (m, 1H), 4.24 (dd, J=3.7, 1.7 Hz, 1H), 4.12 (dt, J=6.7, 3.5 Hz, 2H), 3.65 (d, J=2.7 Hz, 2H), 3.62 (d, J=2.6 Hz, 2H), 1.54 (s, 3H), 1.29 (s, 3H). LR-MS (ESI) m/z [M]$^+$ calculated for C$_{15}$H$_{20}$NO$_8$P 373.1, observed 373.9.

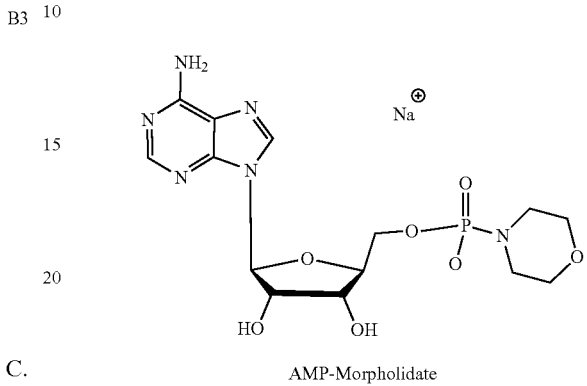

AMP-Morpholidate

AMP-Morpholidate was synthesized according to the literature procedure[34].

$^1$H NMR (400 MHz, D$_2$O) δ 8.35 (s, 1H), 8.13 (s, 1H), 6.03 (d, J=5.0 Hz, 1H), 4.73-4.70 (m, 2H, overlapped by D$_2$O peak) 4.45 (t, J=4.7 Hz, 1H), 4.28 (s, 1H), 3.95 (dt, J=11.6, 5.7 Hz, 2H), 3.48 (t, J=4.3 Hz, 4H), 2.85 (t, J=4.0, 2.4 Hz, 4H), 2.65 (t, 1H).

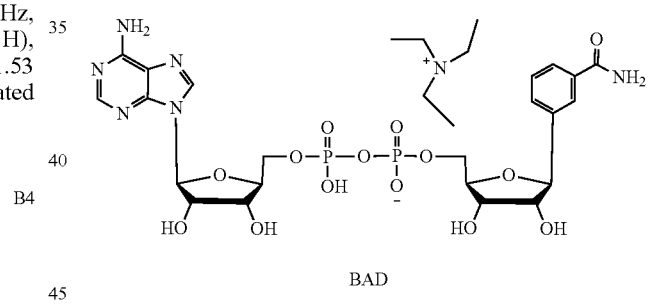

BAD

AMP-morpholidate (22.5 mg, 0.051 mmol), B4 (26.8 mg, 0.056 mmol, 1.1 equiv), and MgSO$_4$ (12 mg, 0.1 mmol, 2.0 equiv) were dissolved in a solution of MnCl$_2$ (0.4 ml, 0.2 M in formamide) and stirred at RT for overnight. After the completion of the coupling reaction monitored by MS, H$_2$O (4.0 mL) was added. To this mixture DOWEX 50× (1.0 g) was added and stirred the mixture at RT overnight. After the complete deprotection of acetonide groups (monitored by MS), the resin was filtered off and the aqueous solution was concentrated to dryness and re-suspended in methanol and the crude product was purified via preparative HPLC using 50 mM TEAB buffer and acetonitrile. The fraction containing the product were pooled and concentrated to yield the product as TEA salt (7.0 mg).

$^1$H NMR (400 MHz, D2O) δ 8.31 (s, 1H), 8.07 (s, 1H), 7.63 (s, 1H), 7.51 (d, J=7.9 Hz, 1H), 7.45 (d, J=7.7 Hz, 1H), 7.29 (t, J=7.7 Hz, 1H), 5.94 (d, J=5.5 Hz, 1H), 4.40-4.34 (m, 2H), 4.27 (s, 2H), 4.22-4.03 (m, 6H), 3.96 (dd, J=7.0, 5.2 Hz, 1H). Missing peaks are overlapped in the D$_2$O signal. LR-MS (ESI) m/z [M]$^+$ calculated for C$_{22}$H$_{28}$N$_6$O$_{14}$P$_2$ 2662.1, observed 662.1.

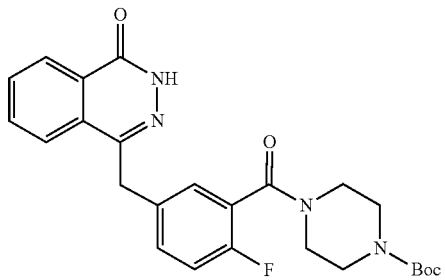

tert-butyl 4-(2-fluoro-5-((4-oxo-3,4-dihydrophthalazin-1-yl)methyl)benzoyl)piperazine-1-carboxylate (P1)

2-fluoro-5-((4-oxo-3,4-dihydrophthalazin-1-yl)methyl) benzoic acid (0.30 g, 1.0 mmol) and N-Boc piperizine (0.186 g, 1.0 mmol, 1.0 equiv.) were dissolved in DMF (2.0 mL). To this mixture was added T3P (1.2 mL, 2.0 mmol, 2.0 equiv.) and DIPEA (0.5 mL, 3.0 mmol. 3.0 equiv.). The resulting mixture was stirred at room temperature for 2 h. Upon reaction completion monitored by TLC, the mixture was diluted with ethyl acetate, washed with sat.NaHCO$_3$, H$_2$O and brine. The organic layer was passed through a silica plug, dried over MgSO$_4$ and concentrated to yield 1 as white solid (0.393 g, 84%).

$^1$H NMR (400 MHz, Chloroform-d) δ 10.46 (s, 1H) 8.54-8.42 (m, 1H), 7.86-7.65 (m, 3H), 7.33 (m, 2H), 7.08-7.01 (t, J=8.5Hz, 1H), 4.30 (s, 2H), 3.76 (br, 2H), 3.53 (br, 2H), 3.39 (t, J=4.71 Hz, 2H), 3.28 (br, 2H), 1.48 (s, 9H). LR-MS (ESI) m/z [M–H]$^-$ calculated for C$_{25}$H$_{26}$FN$_4$O$_4^-$ 465.2, observed 465.1.

4-(4-fluoro-3-(piperazine-1-carbonyl)benzyl)phthalazin-1(2H)-one

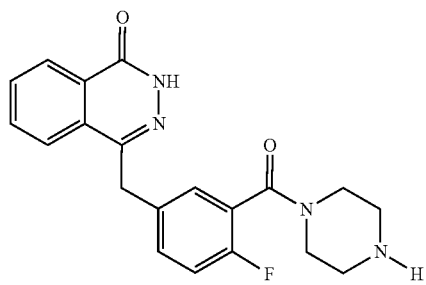

To a suspension of P1 (0.39 g, 0.83 mmol) in ethanol (20 mL) were added 6N HCl in dioxane (4.1 mL) and stirred the mixture at room temperature (rt) for overnight. Upon the completion of the reaction, monitored by TLC, the solvent was evaporated and further co-evaporated with acetonitrile to form an oily residue. The oily residue was dissolved in a small amount of methanol and triturated. Evaporation of the solvent yielded a yellow crystalline powder (0.215 g, 70%)

$^1$H NMR (400 MHz, DMSO-d$_6$) δ 12.59 (s, 1H), 9.49 (s, 1H), 8.26 (d, J=7.6 Hz, 1H), 8.01-7.75 (m, 3H), 7.51-7.35 (m, 2H), 7.25 (t, J=8.9 Hz, 1H), 4.33 (s, 2H), 3.84 (br, 2H), 3.43 (br, 2H), 3.17 (br, 2H), 3.00 (br, 2H).

LR-MS (ESI) m/z [M]$^+$ calculated for C$_{20}$H$_{19}$FN$_4$O$_2$ 366.1, observed 366.9

2-(3-(but-3-yn-1-yl)-3H-diazirin-3-yl)ethyl (4-nitrophenyl) carbonate

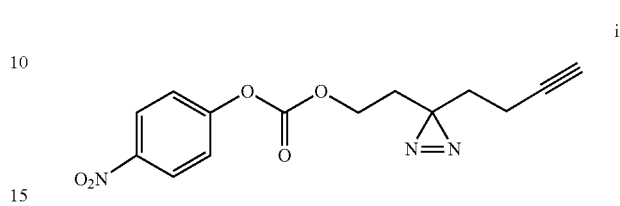

2-(3-(but-3-yn-1-yl)-3H-diazirin-3-yl)ethan-1-ol (0.03 g, 0.217 mmol) was dissolved in dry acetonitrile (1.0 mL) and cooled to 0° C. Added pyridine (0.035 mL, 0.434 mmol, 2.0 equiv.) and stirred for 15 mins. A solution of 4-nitrophenyl-chloroformate (0.66 g, 0.32 mmol, 1.5 equiv.) dissolved in acetonitrile (1 mL) was added dropwise to the above mixture and the reaction was warmed to room temperature and stirred overnight. The reaction was then concentrated and quenched with water, extracted with ethyl acetate (2×5 mL), dried over MgSO$_4$ and concentrated. The crude product was purified via a Combiflash Companion system (24 g Redisep Rf Normal Phase; MP A: hexanes, MP B: Ethyl acetate) to yield the product which was contaminated with nitrophenol derivative was used in the next step without further purification.

$^1$NMR (400 MHz, Chloroform-d) δ 8.29 (d, J=9.0 Hz, 2H), 7.40 (d, J=9.0 Hz, 2H), 4.20 (t, J=6.3 Hz, 2H), 2.10-1.99 (m, 3H), 1.90 (t, J=6.3 Hz, 2H), 1.72 (t, J=7.3 Hz, 2H).

2-(3-(but-3-yn-1-yl)-3H-diazirin-3-yl)ethyl 4-(2-fluoro-5-((4-oxo-3,4-dihydrophthalazin-1-yl) methyl)benzoyl) piperazine-1-carboxylate

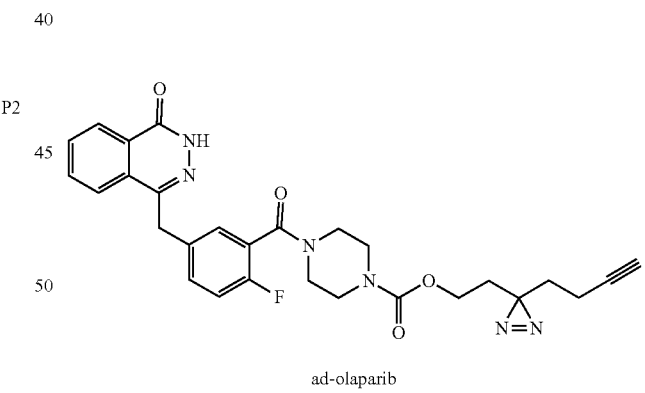

ad-olaparib 4-(4-fluoro-3-(piperazine-1-carbonyl)benzyl)phthalazin-1(2H)-one P2 (7.5 mg, 0.02 mmol) and 2-(3-(but-3-yn-1-yl)-3H-diazirin-3-yl)ethyl (4-nitrophenyl) carbonate i (6.0 mg, 0.02, 1.0 equvi) were dissolved in anhydrous DMF (0.4 mL). TEA (40 μL, 0.028 mmol, 1.4 equiv.) was added and the reaction was left to stir overnight at room temperature. Up on reaction completion monitored by TLC, it was quenched with water (1.0 mL) and extracted with ethyl acetate (2×5 mL). The ethyl acetate was then washed with brine (3×5 mL). The organic layer was then passed through a silica plug, dried over MgSO$_4$, and concentrated to yield white solid (9.6 mg, 89%).

$^1$H NMR (400 MHz, Chloroform-d) δ 10.37 (s, 1H), 8.60-8.33 (m, 1H), 7.81-7.67 (m, 3H), 7.37-7.27 (m, 2H), 7.04 (t, J=8.7 Hz, 1H), 4.28 (s, 2H), 4.03 (t, J=6.1 Hz, 2H), 3.79 (br, 2H), 3.60 (br, 2H), 3.47 (br, 2H), 3.31 (br, 2H), 2.07-1.94 (m, 3H), 1.80-11.75 (m, 2H), 1.69-1.64 (m, 2H). LR-MS (ESI) m/z [M]$^+$ calculated for $C_{28}H_{27}FN_6O_4$, 530.2 observed 530.7.

REFERENCES (1) Cohen, M. S. Interplay between Compartmentalized NAD+ Synthesis and Consumption: A Focus on the PARP Family. *Genes and Development*. Cold Spring Harbor Laboratory Press Mar. 1, 2020, pp 254-262. https://doi.org/10.1101/gad.335109.119.

(2) Liu, et al, Quantitative Analysis of NAD Synthesis-Breakdown Fluxes. *Cell Metab.* 2018, 27 (5), 1067-1080.e5. https://doi.org/10.1016/j.cmet.2018.03.018.

(3) Essuman, et al, The SARM1 Toll/Interleukin-1 Receptor Domain Possesses Intrinsic NAD+ Cleavage Activity That Promotes Pathological Axonal Degeneration. *Neuron* 2017, 93 (6), 1334-1343.e5. https://doi.org/10.1016/j.neuron.2017.02.022.

(4) Essuman, et al, TIR Domain Proteins Are an Ancient Family of NAD+-Consuming Enzymes. *Curr. Biol.* 2018, 28 (3), 421-430.e4. https://doi.org/10.1016/j.cub.2017.12.024.

(5) Horsefield, S et al, NAD+ Cleavage Activity by Animal and Plant TIR Domains in Cell Death Pathways. *Science (80-.).* 2019, 365 (6455), 793-799. https://doi.org/10.1126/science.aax1911.

(6) Loring, et al, Initial Kinetic Characterization of Sterile Alpha and Toll/Interleukin Receptor Motif-Containing Protein 1. *Biochemistry* 2020, 59 (8), 933-942. https://doi.org/10.1021/acs.biochem.9b01078.

(7) Chatrin, et al, Structural Insights into ADP-Ribosylation of Ubiquitin by Deltex Family E3 Ubiquitin Ligases. *Sci. Adv.* 2020, 6 (38), eabc0418. https://doi.org/10.1126/sciadv.abc0418.

(8) Liu, et al, Insights into the Inhibitory Mechanisms of NADH on the Ay Heterodimer of Human NAD-Dependent Isocitrate Dehydrogenase. *Sci. Rep.* 2018, 8 (1), 3146. https://doi.org/10.1038/s41598-018-21584-7.

(9) Murale, et al, Photo-Affinity Labeling (PAL) in Chemical Proteomics: A Handy Tool to Investigate Protein-Protein Interactions (PPIs). *Proteome Science*. BioMed Central Ltd. Jun. 24, 2017, pp 1-34. https://doi.org/10.1186/s12953-017-0123-3.

(10) Guo, et al, Developments of Bioorthogonal Handle-Containing Photo-Crosslinkers for Photoaffinity Labeling. *MedChemComm*. Royal Society of Chemistry Aug. 16, 2017, pp 1585-1591. https://doi.org/10.1039/c7md00217c.

(11) Cravatt, et al, Activity-Based Protein Profiling: From Enzyme Chemistry to Proteomic Chemistry. *Annu. Rev. Biochem.* 2008, 77 (1), 383-414. https://doi.org/10.1146/annurev.biochem.75.101304.124125.

(12) Jelcic, et al, Photo-Clickable ATP-Mimetic Reveals Nucleotide Interactors in the Membrane Proteome. *Cell Chem. Biol.* 2020. https://doi.org/10.1016/j.chembiol.2020.05.010.

(13) Fehr, et al, The Impact of PARPs and ADP-Ribosylation on Inflammation and Host-Pathogen Interactions. *Genes and Development*. Cold Spring Harbor Laboratory Press Mar. 1, 2020, pp 341-359. https://doi.org/10.1101/gad.334425.119.

(14) Kim, et al, Poly(ADP-Ribosyl)Ation by PARP-1: "PAR-Laying" NAD+ into a Nuclear Signal. *Genes and Development*. Cold Spring Harbor Laboratory Press Sep. 1, 2005, pp 1951-1967. https://doi.org/10.1101/gad.1331805.

(15) Zatorski, et al, Chemical Synthesis of Benzamide Adenine Dinucleotide: Inhibition of Inosine Monophosphate Dehydrogenase (Types I and II). *J. Med. Chem.* 1996, 39 (12), 2422-2426. https://doi.org/10.1021/jm9601415.

(16) Slama, et al, Carbanicotinamide Adenine Dinucleotide: Synthesis and Enzymological Properties of a Carbocyclic Analogue of Oxidized Nicotinamide Adenine Dinucleotide. *Biochemistry* 1988, 27 (1), 183-193. https://doi.org/10.1021/bi00401a028.

(17) Dai, et al, Facile Chemoenzymatic Synthesis of a Novel Stable Mimic of NAD+. *Chem. Sci.* 2018, 9 (44), 8337-8342. https://doi.org/10.1039/c8sc03899f.

(18) Langelier, et al, NAD+ Analog Reveals PARP-1 Substrate-Blocking Mechanism and Allosteric Communication from Catalytic Center to DNA-Binding Domains. *Nat. Commun.* 2018, 9 (1), 1-13. https://doi.org/10.1038/s41467-018-03234-8.

(19) Carter-O'Connell, et al, Engineering the Substrate Specificity of ADP-Ribosyltransferases for Identifying Direct Protein Targets. *J. Am. Chem. Soc.* 2014, 136 (14), 5201-5204. https://doi.org/10.1021/ja412897a.

(20) Carter-O'Connell, et al, Identifying Family-Member-Specific Targets of Mono-ARTDs by Using a Chemical Genetics Approach. *Cell Rep.* 2016, 14 (3), 621-631. https://doi.org/10.1016/j.celrep.2015.12.045.

(21) Li, et al, Design and Synthesis of Minimalist Terminal Alkyne-Containing Diazirine Photo-Crosslinkers and Their Incorporation into Kinase Inhibitors for Cell- and Tissue-Based Proteome Profiling. *Angew. Chemie-Int. Ed.* 2013, 52 (33), 8551-8556. https://doi.org/10.1002/anie.201300683.

(22) Sanderson, et al, Mechanisms Governing PARP Expression, Localization, and Activity in Cells. *Critical Reviews in Biochemistry and Molecular Biology*. Taylor and Francis Ltd. 2020. https://doi.org/10.1080/10409238.2020.1818686.

(23) Wallrodt, et al, Bioorthogonally Functionalized NAD+ Analogues for In-Cell Visualization of Poly (ADP-Ribose) Formation. *Angew. Chemie Int. Ed.* 2016, 55 (27), 7660-7664. https://doi.org/10.1002/anie.201600464.

(24) Rodriguez, et al, Chemical Genetics and Proteome-Wide Site Mapping Reveal Cysteine MARylation by PARP-7 on Immune-Relevant Protein Targets. *Elife* 2021, 10. https://doi.org/10.7554/eLife.60480.

(25) Suskiewicz, et al, HPF1 Completes the PARP Active Site for DNA Damage-Induced ADP-Ribosylation. *Nature* 2020, 579 (7800), 598-602. https://doi.org/10.1038/s41586-020-2013-6.

(26) Horning, et al, Chemical Proteomic Profiling of Human Methyltransferases. *J. Am. Chem. Soc.* 2016, 138 (40), 13335-13343. https://doi.org/10.1021/jacs.6b07830.

(27) Papeo, et al, Discovery of 2-[1-(4,4-Difluorocyclohexyl)Piperidin-4-Yl]-6-Fluoro-3-Oxo-2,3-Dihydro-1H-Isoindole-4-Carboxamide (NMS-P118): A Potent, Orally Available, and Highly Selective PARP-1 Inhibitor for Cancer Therapy. *J. Med. Chem.* 2015, 58 (17), 6875-6898. https://doi.org/10.1021/acs.jmedchem.5b00680.

(28) Kirby, et al, A Potent and Selective PARP11 Inhibitor Suggests Coupling between Cellular Localization and Catalytic Activity. *Cell Chem. Biol.* 2018, 25 (12), 1547-1553.e12. https://doi.org/10.1016/j.chembiol.2018.09.011.

(29) Fjeld, et al, Differential Binding of NAD+ and NADH Allows the Transcriptional Corepressor Carboxyl-Terminal Binding Protein to Serve as a Metabolic Sensor. *Proc. Natl. Acad. Sci. U.S.A.* 2003, 100 (16), 9202-9207. https://doi.org/10.1073/pnas.1633591100.

(30) Madison, et al, Nicotinamide Adenine Dinucleotide-Induced Multimerization of the Co-Repressor CtBP1 Relies on a Switching Tryptophan. *J. Biol. Chem.* 2013, 288 (39), 27836-27848. https://doi.org/10.1074/jbc.M113.493569.

(31) Klepinin, et al, Adenylate Kinase and Metabolic Signaling in Cancer Cells. *Frontiers in Oncology.* Frontiers Media S. A. May 19, 2020. https://doi.org/10.3389/fonc.2020.00660.

(32) Storey, K. B. Purification and properties of squid mantle adenylate kinase. Role of NADH in control of the enzyme https://www.jbc.org/content/251/24/7810 (accessed Nov. 10, 2020).

(33) Watanabe, et al, Interaction between Cytosolic Adenylate Kinase and Nicotinamide Adenine Dinucleotide. *Japanese J. Vet. Sci.* 1988, 50 (2), 509-512. https://doi.org/10.1292/jvms1939.50.509.

(34) Carter-O'Connell, et al, M. S. Engineering the Substrate Specificity of ADP-Ribosyltransferases for Identifying Direct Protein Targets. *J. Am. Chem. Soc.* 2014, 136 (14), 5201-5204. https://doi.org/10.1021/ja412897a.

(35) Kirby, et al, A Potent and Selective PARP11 Inhibitor Suggests Coupling between Cellular Localization and Catalytic Activity. *Cell Chem. Biol.* 2018, 25 (12), 1547-1553.e12. https://doi.org/10.1016/j.chembiol.2018.09.011.

(36) Eng, et al, Comet: An Open-Source MS/MS Sequence Database Search Tool. *Proteomics* 2013, 13 (1), 22-24. https://doi.org/10.1002/pmic.201200439.

(37) Wilmarth, et al, Techniques for Accurate Protein Identification in Shotgun Proteomic Studies of Human, Mouse, Bovine, and Chicken Lenses. *J. Ocul. Biol. Dis. Infor.* 2009, 2 (4), 223-234. https://doi.org/10.1007/s12177-009-9042-6.

(38) Keller, et al, Empirical Statistical Model to Estimate the Accuracy of Peptide Identifications Made by MS/MS and Database Search. *Anal. Chem.* 2002, 74 (20), 5383-5392. https://doi.org/10.1021/ac025747h.

(39) Kleiner, et al, A Whole Proteome Inventory of Background Photocrosslinker Binding. Angew. *Chemie Int. Ed.* 2017, 56 (5), 1396-1401. https://doi.org/10.1002/anie.201605993.

(40) Krohn, et al, Synthesis and Cytotoxic Activity of C-Glycosidic Nicotinamide Riboside Analogs. *J. Med. Chem.* 1992, 35 (3), 511-517. https://doi.org/10.1021/jm00081a012.

(41) Bonnac, et al, Efficient Synthesis of Benzamide Riboside, a Potential Anticancer Agent. *Nucleosides, Nucleotides and Nucleic Acids* 2007, 26 (10-12), 1249-1253. https://doi.org/10.1080/15257770701528222.

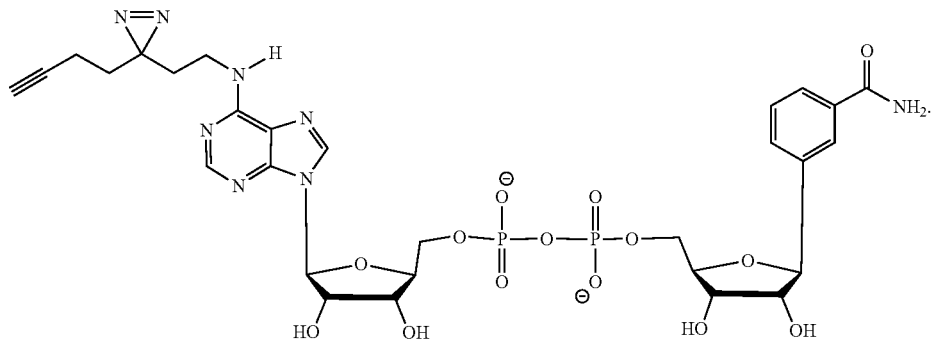

11. The photo-affinity labeling probe composition of claim 9, wherein the compound is:
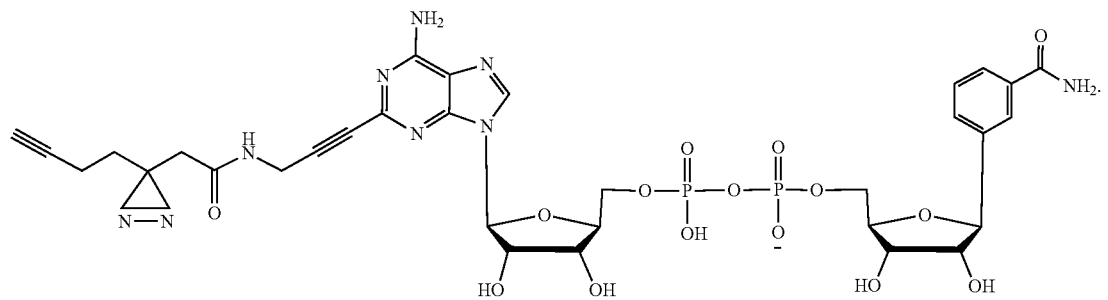

What is claimed:

1. A compound selected from the group of:

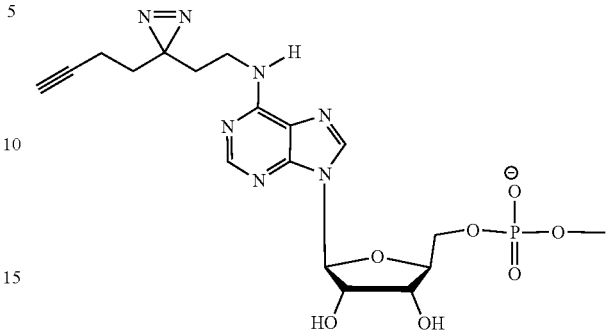

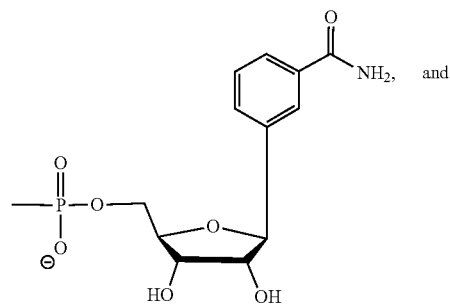

and

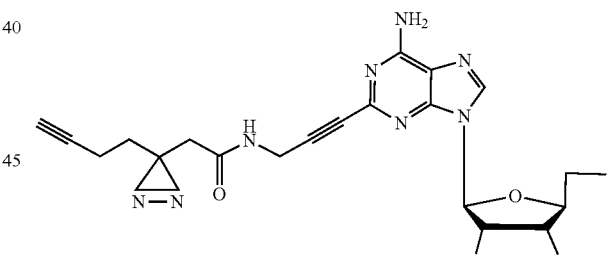

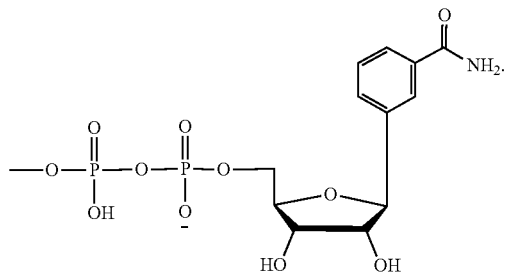

2. The compound of claim 1, which is:

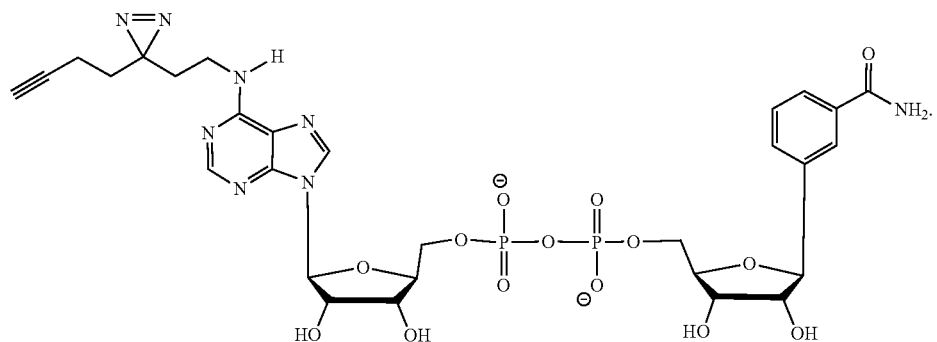

3. The compound of claim 1, which is:

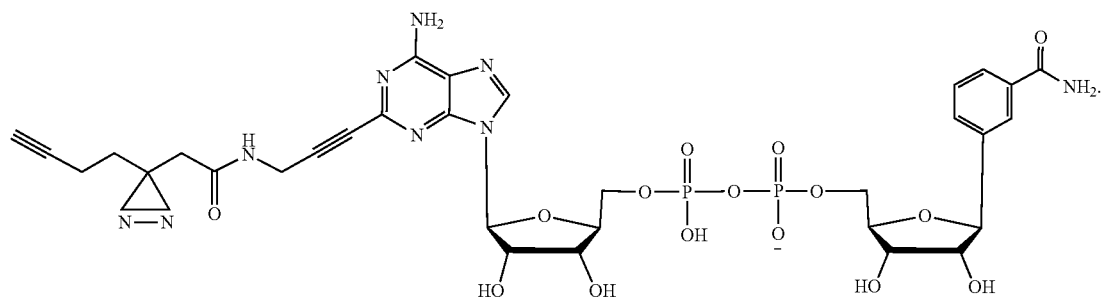

4. A method for identifying a nicotinamide adenine dinucleotide (NAD) protein of interest, the method comprising the steps of:
(i) providing an NAD probe comprising a compound selected from the group of:

(ii) irradiating the NAD probe of (i) with a specific wavelength of light to activate the photo-reactive moiety of the NAD Probe;
(iii) contacting the NAD protein of interest with the activated NAD probe of (ii) to form a complex through

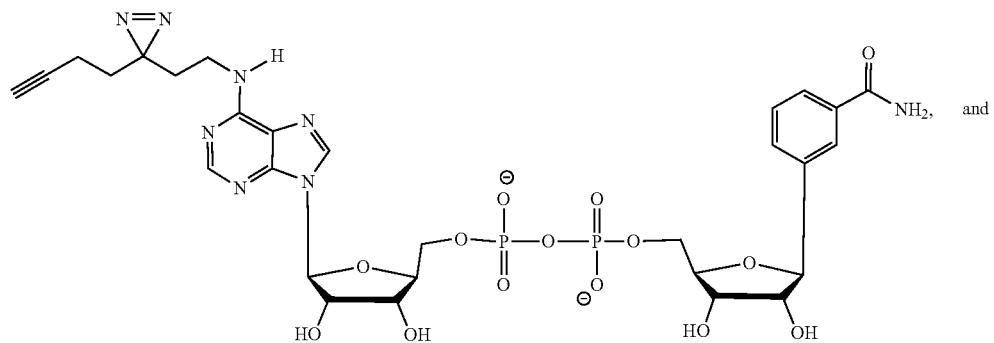

and

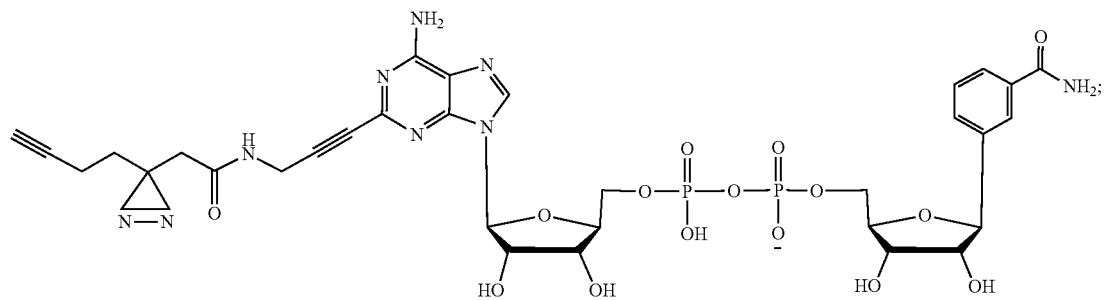

a photo-induced covalent bond between the activated NAD probe and the NAD protein of interest;

(iv) identifying the complex produced in (iii) that is bound to the NAD probe, thereby identifying the NAD protein of interest.

5. The method of claim 4, wherein the NAD substrate contains an enzymatically stable nicotinamide glycosidic bond to facilitate cleavage resistance of the NAD substrate to NAD consumers.

6. The method of claim 4, wherein the NAD substrate is at least one substrate selected from a benzamide adenine dinucleotide (BAD) substrate, a carba-NAD substrate, and a 4-thioribose NAD substrate.

7. The method of claim 4, wherein the specific wavelength of light is an ultraviolet wavelength.

8. The method of claim 4, wherein the specific wavelength of light is about 100 nm to about 400 nm.

9. A photo-affinity labeling probe composition comprising a useful amount of a compound selected from the group of:

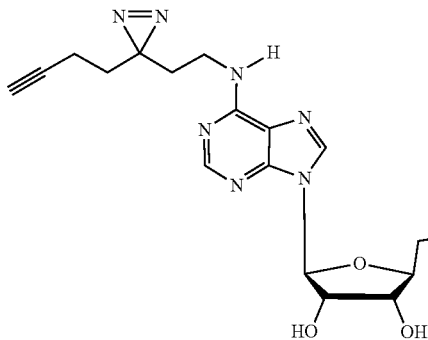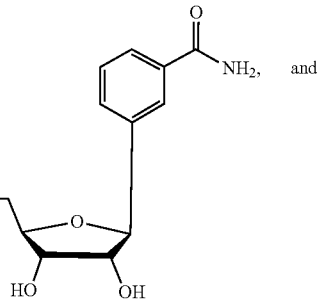

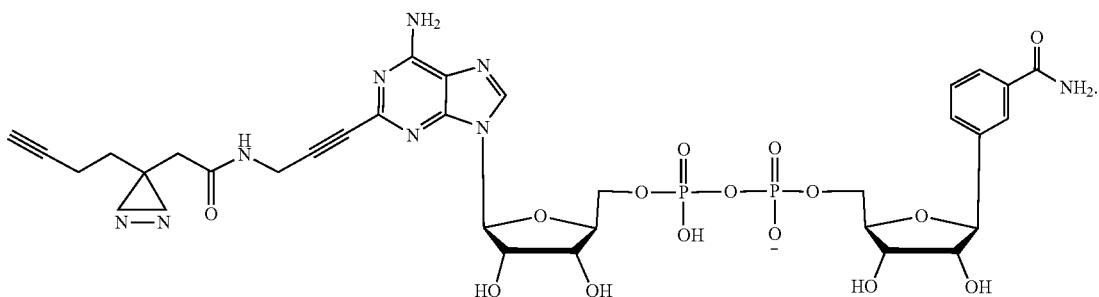

10. The photo-affinity labeling probe composition of claim 9, wherein the compound is: